US012261635B2

(12) United States Patent
Loh et al.

(10) Patent No.: US 12,261,635 B2
(45) Date of Patent: *Mar. 25, 2025

(54) FILTER REUSE IN RADIO FREQUENCY FRONT-ENDS

(71) Applicant: Skyworks Solutions, Inc., Irvine, CA (US)

(72) Inventors: Lup Meng Loh, Plano, TX (US); Aleksey A. Lyalin, Moorpark, CA (US); David Richard Pehlke, Westlake Village, CA (US); Anand Raghavan, Middleton, WI (US); Jin Hoon Cho, Newbury Park, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 18/308,060

(22) Filed: Apr. 27, 2023

(65) Prior Publication Data

US 2023/0344452 A1 Oct. 26, 2023

Related U.S. Application Data

(63) Continuation of application No. 17/445,924, filed on Aug. 25, 2021, now Pat. No. 11,671,122.

(60) Provisional application No. 62/706,581, filed on Aug. 26, 2020.

(51) Int. Cl.
*H04B 1/00* (2006.01)
*H04B 1/04* (2006.01)

(52) U.S. Cl.
CPC ......... *H04B 1/0078* (2013.01); *H04B 1/0458* (2013.01); *H04B 2001/0408* (2013.01)

(58) Field of Classification Search
CPC .......... H04B 1/0078; H04B 2001/0408; H04B 1/0458; H04B 1/0057
USPC .................................................. 375/219, 262
See application file for complete search history.

(56) References Cited

U.S. PATENT DOCUMENTS

| | | |
|---|---|---|
| 5,625,307 A | 4/1997 | Scheinberg |
| 6,370,372 B1 | 4/2002 | Molnar et al. |
| 6,501,331 B2 | 12/2002 | Adar |
| 6,516,184 B1 | 2/2003 | Damgaard et al. |
| 6,658,237 B1 | 12/2003 | Rozenblit et al. |
| 6,759,922 B2 | 7/2004 | Adar et al. |
| 6,766,178 B1 | 7/2004 | Damgaard et al. |
| 7,260,363 B1 | 8/2007 | Snodgrass |
| 7,283,075 B2 | 10/2007 | Lu et al. |
| 7,376,116 B2 | 5/2008 | Rozenblit et al. |
| 7,400,873 B2 | 7/2008 | Bayruns |
| 7,502,625 B2 | 3/2009 | Beamish et al. |

(Continued)

*Primary Examiner* — Emmanuel Bayard
(74) *Attorney, Agent, or Firm* — Knobbe, Martens, Olson & Bear, LLP

(57) ABSTRACT

Radio frequency front-end systems with filter reuse. In certain embodiments, a front-end system includes a filter, a low noise amplifier (LNA), and a switch interposed between the filter and an input to the LNA. In a first state of the switch, the filter serves to filter a radio frequency signal that is amplified by the LNA. The front-end system further includes a power amplifier that is coupled to the switch. Additionally, in a second state of the switch, the filter serves to filter an amplified radio frequency transmit signal provided by the power amplifier. Accordingly, a filter along a receive path of the front-end system is reused for transmit.

20 Claims, 17 Drawing Sheets

(56) References Cited

U.S. PATENT DOCUMENTS

| | | |
|---|---|---|
| 7,512,388 B2 | 3/2009 | Snider |
| 7,605,669 B2 | 10/2009 | Pullela et al. |
| 7,729,674 B2 | 6/2010 | Shie et al. |
| 7,973,603 B2 | 7/2011 | Kammula et al. |
| 8,461,931 B1 | 6/2013 | Bayruns et al. |
| 8,736,378 B1 | 5/2014 | Hau |
| 9,014,647 B2 | 4/2015 | Kitching et al. |
| 9,413,320 B1 | 8/2016 | Pinkhasov |
| 9,419,568 B2 | 8/2016 | Beltran Lizarraga |
| 9,450,541 B2 | 9/2016 | Beltran Lizarraga et al. |
| 9,496,902 B2 | 11/2016 | Srirattana et al. |
| 9,496,913 B2 | 11/2016 | King et al. |
| 9,530,771 B2 | 12/2016 | Roy et al. |
| 9,537,452 B2 | 1/2017 | Samelis |
| 9,553,617 B2 | 1/2017 | Srirattana et al. |
| 9,590,569 B2 | 3/2017 | Thompson et al. |
| 9,608,749 B2 | 3/2017 | Mueller et al. |
| 9,654,169 B2 | 5/2017 | Wloczysiak |
| 9,705,453 B2 | 7/2017 | Beltran Lizarraga |
| 9,853,610 B2 | 12/2017 | Beltran Lizarraga et al. |
| 9,882,538 B2 | 1/2018 | Poulin et al. |
| 9,882,587 B2 | 1/2018 | Feng et al. |
| 9,935,662 B2 | 4/2018 | Khlat et al. |
| 9,941,856 B2 | 4/2018 | Srirattana et al. |
| 9,948,271 B2 | 4/2018 | Srirattana et al. |
| 9,960,750 B2 | 5/2018 | Srirattana et al. |
| 9,973,153 B2 | 5/2018 | Samelis |
| 9,978,732 B2 | 5/2018 | Penunuri et al. |
| 9,979,349 B2 | 5/2018 | Lehtola |
| 9,991,857 B2 | 6/2018 | Beltran Lizarraga |
| 10,177,711 B2 | 1/2019 | Lehtola |
| 10,277,174 B2 | 4/2019 | Lehtola |
| 10,355,724 B2 | 7/2019 | Feng et al. |
| 10,396,735 B2 | 8/2019 | Bergsma |
| 10,396,737 B2 | 8/2019 | Domino et al. |
| 10,418,951 B2 | 9/2019 | Poulin et al. |
| 10,439,665 B2 | 10/2019 | Domino et al. |
| 10,623,046 B2 | 4/2020 | Sun et al. |
| 10,630,320 B2 | 4/2020 | King |
| 10,666,300 B2 | 5/2020 | Wloczysiak et al. |
| 10,756,688 B2 | 8/2020 | Bergsma |
| 10,778,178 B2 | 9/2020 | Ghim et al. |
| 10,873,384 B2 | 12/2020 | Wloczysiak |
| 10,886,953 B2 | 1/2021 | Feng et al. |
| 10,944,377 B2 | 3/2021 | Hosagavi Puttaraju et al. |
| 11,101,775 B2 | 8/2021 | Datta et al. |
| 11,349,448 B2 | 5/2022 | Sun et al. |
| 11,411,615 B2 | 8/2022 | Freisleben et al. |
| 11,601,144 B2 * | 3/2023 | Loh ..................... H04B 1/0078 |
| 11,671,122 B2 * | 6/2023 | Loh ..................... H04B 1/0078 |
| | | 375/262 |
| 11,855,663 B2 | 12/2023 | Loh et al. |
| 2012/0293265 A1 * | 11/2012 | Heikkinen ............. H03F 1/565 |
| | | 330/307 |
| 2015/0091776 A1 | 4/2015 | Gaynor et al. |
| 2015/0303974 A1 | 10/2015 | Domino |
| 2019/0334493 A1 | 10/2019 | Domino et al. |
| 2019/0363696 A1 | 11/2019 | Komatsu et al. |
| 2020/0021257 A1 | 1/2020 | Poulin et al. |
| 2020/0195295 A1 | 6/2020 | Kondo et al. |
| 2020/0220242 A1 | 7/2020 | Kim et al. |
| 2020/0235768 A1 | 7/2020 | Ni et al. |
| 2020/0358405 A1 | 11/2020 | Tanaka et al. |
| 2020/0358460 A1 | 11/2020 | Wloczysiak et al. |
| 2020/0412403 A1 | 12/2020 | Pehlke |
| 2021/0091806 A1 | 3/2021 | Anthony et al. |
| 2023/0179234 A1 | 6/2023 | Loh et al. |
| 2023/0412198 A1 | 12/2023 | Loh et al. |

* cited by examiner

FILTER REUSE IN RADIO FREQUENCY FRONT-ENDS

CROSS-REFERENCE TO RELATED APPLICATIONS

This application is a continuation of U.S. application Ser. No. 17/445,924 filed Aug. 25, 2021 and titled "FILTER REUSE IN RADIO FREQUENCY FRONT-ENDS," which claims the benefit of priority under 35 U.S.C. § 119 of U.S. Provisional Patent Application No. 62/706,581, filed Aug. 26, 2020 and titled "FILTER REUSE IN RADIO FREQUENCY FRONT-ENDS," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about such as in the range of about 410 MHz to about 7.125 GHz for Fifth Generation (5G) cellular communications in Frequency Range 1 (FR1) or in the range of about 24.25 GHz to 52.6 GHz for 5G communications in Frequency Range 2 (FR2).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a radio frequency front-end system. The radio frequency front-end system includes a first broadband radio frequency module including a first transmit circuit selectively operable in a first frequency band or a second frequency band, a first receive circuit selectively operable in the first frequency band or the second frequency band, and a second receive circuit selectively operable in the first frequency band or the second frequency band. The radio frequency front-end system further includes a second broadband radio frequency module including a third receive circuit selectively operable in the first frequency band or the second frequency band, and a fourth receive circuit selectively operable in the first frequency band or the second frequency band.

In some embodiments, the first broadband radio frequency module is coupled to a first antenna port and a second antenna port, and the second broadband radio frequency module is coupled to a third antenna port and a fourth antenna port. According to a number of embodiments, the second broadband radio frequency module does not transmit in the first frequency band or the second frequency band. In accordance with several embodiments, the first broadband radio frequency module and the second broadband radio frequency module support non-concurrent carrier aggregation for the first frequency band and the second frequency band. According to various embodiments, the first broadband radio frequency module and the second broadband radio frequency module are operable to support sounding reference signal (SRS) antenna port switching for both the first frequency band and the second frequency band on each of the first antenna port, the second antenna port, the third antenna port, and the fourth antenna port. In accordance with several embodiments, the first broadband radio frequency module is connected to the second broadband radio frequency module by a signal route to support SRS antenna port switching. According to various embodiments, the second broadband radio frequency module further includes a second transmit circuit selectively operable in the first frequency band or the second frequency band. In accordance with a number of embodiments, the first broadband radio frequency module and the second broadband radio frequency module support non-concurrent carrier aggregation for the first frequency band and the second frequency band. According to several embodiments, the first broadband radio frequency module and the second broadband radio frequency module are operable to support SRS antenna port switching for both the first frequency band and the second frequency band on each of the first antenna port, the second antenna port, the third antenna port, and the fourth antenna port. In accordance with various embodiments, the first broadband radio frequency module and the second broadband radio frequency module are operable to support SRS antenna port switching without any signal paths between the first broadband radio frequency module and the second broadband radio frequency module. According to a number of embodiments, the first broadband radio frequency module and the second broadband radio frequency module are operable to support dual uplink multiple-input multiple-output (MIMO) communications for both the first frequency band and the second frequency band. In accordance with several embodiments, the radio frequency front-end system further includes a first antenna-plexer coupled between the first broadband radio frequency module and the first antenna port, a second antenna-plexer coupled between the first broadband radio frequency module and the second antenna port, a third antenna-plexer coupled between the second broadband radio frequency module and the third antenna port, and a fourth antenna-plexer coupled between the second broadband radio frequency module and the fourth antenna port.

In various embodiments, the radio frequency front-end system further includes a third broadband radio frequency module including a fifth receive circuit selectively operable in the first frequency band or the second frequency band and a sixth receive circuit selectively operable in the first frequency band or the second frequency band, and a fourth broadband radio frequency module including a seventh receive circuit selectively operable in the first frequency band or the second frequency band and an eighth receive circuit selectively operable in the first frequency band or the second frequency band. According to a number of embodiments, the first broadband radio frequency module is coupled to a first antenna port, the second broadband radio frequency module is coupled to a second antenna port, the third broadband radio frequency module is coupled to a third antenna port, and the fourth broadband radio frequency module is coupled to a fourth antenna port. In accordance with several embodiments, the first broadband radio frequency module, the second broadband radio frequency module, the third broadband radio frequency module, and the fourth broadband radio frequency module support concurrent carrier aggregation for the first frequency band and the second frequency band. According to some embodiments, the second broadband radio frequency module, the third broadband radio frequency module, and the fourth broadband radio frequency do not transmit in the first frequency band or the second frequency band. In accordance with a number of embodiments, the first broadband radio frequency module, the second broadband radio frequency module, the third broadband radio frequency module, and the fourth broadband radio frequency module support SRS antenna port switching for both the first frequency band and the second frequency band on each of the first antenna port, the second antenna port, the third antenna port, and the fourth antenna port. According to several embodiments, the first broadband radio frequency module is connected to the second broadband radio frequency module by a first SRS signal route, to the third broadband radio frequency module by a second SRS signal route, and to the fourth broadband radio frequency module by a third SRS signal route. In accordance with various embodiments, the third broadband radio frequency module further includes a second transmit circuit selectively operable in the first frequency band or the second frequency band. According to a number of embodiments, the first broadband radio frequency module and the third broadband radio frequency module are operable to support SRS antenna port switching for both the first frequency band and the second frequency band on each of the first antenna port, the second antenna port, the third antenna port, and the fourth antenna port. In accordance with some embodiments, the first broadband radio frequency module is coupled to the second broadband radio frequency module by a first SRS signal path, and the third broadband radio frequency module is coupled to the fourth broadband radio frequency module by a second SRS signal path. According to several embodiments, the first broadband radio frequency module and the third broadband radio frequency module are operable to support dual MIMO communications for both the first frequency band and the second frequency band. In accordance with various embodiments, the radio frequency front-end system further includes a first antenna-plexer coupled between the first broadband radio frequency module and the first antenna port, a second antenna-plexer coupled between the second broadband radio frequency module and the second antenna port, a third antenna-plexer coupled between the third broadband radio frequency module and the third antenna port, and a fourth antenna-plexer coupled between the fourth broadband radio frequency module and the fourth antenna port.

In several embodiments, the first frequency band is a first fifth generation band and the second frequency band is a second fifth generation frequency band.

In some embodiments, the first frequency band is n77 and the second frequency band is n79.

In various embodiments, the first frequency band is B41 and the second frequency band is n77.

In a number of embodiments, the first frequency band is n41 and the second frequency band is n78.

In several embodiments, the first frequency band is 5 gigahertz WiFi and the second frequency band is 6 gigahertz WiFi.

In various embodiments, the first transmit circuit includes a bandwidth controllable power amplifier and a bandwidth controllable transmit filter.

In a number of embodiments, the first receive circuit includes a bandwidth controllable low noise amplifier and a bandwidth controllable receive filter.

In several embodiments, the radio frequency front-end system further includes a radio frequency power amplifier module configured to transmit in a third frequency band, the first broadband radio frequency module and the radio frequency power amplifier module configured to operate with a shared power amplifier supply voltage.

In certain embodiments, the present disclosure relates to a mobile device. The mobile device includes a transceiver; and a front-end system coupled to the transceiver. The front-end system includes a first broadband radio frequency module including a first transmit circuit selectively operable in a first frequency band or a second frequency band, a first receive circuit selectively operable in the first frequency band or the second frequency band, and a second receive circuit selectively operable in the first frequency band or the second frequency band. The front-end system further includes a second broadband radio frequency module including a third receive circuit selectively operable in the first frequency band or the second frequency band, and a fourth receive circuit selectively operable in the first frequency band or the second frequency band.

In some embodiments, the mobile device further includes a first antenna coupled to the first broadband radio frequency module, a second antenna coupled to the first broadband radio frequency module, a third antenna coupled to the second broadband radio frequency module, and a fourth antenna coupled to the second broadband radio frequency module. According to a number of embodiments, the second broadband radio frequency module does not transmit in the first frequency band or the second frequency band. In accordance with several embodiments, the first broadband radio frequency module and the second broadband radio frequency module support non-concurrent carrier aggregation for the first frequency band and the second frequency band. According to various embodiments, the first broadband radio frequency module and the second broadband radio frequency module are operable to support SRS antenna port switching for both the first frequency band and the second frequency band on each of the first antenna, the second antenna, the third antenna, and the fourth antenna. In accordance with a number of embodiments, the first broadband radio frequency module is connected to the second broadband radio frequency module by a signal route to support SRS antenna port switching. According to several embodiments, the second broadband radio frequency module further includes a second transmit circuit selectively operable in the first frequency band or the second frequency band. In accordance with various embodiments, the first broadband radio frequency module and the second broadband radio frequency module support non-concurrent carrier aggregation for the first frequency band and the second frequency band. According to a number of embodiments, the first broadband radio frequency module and the second broadband radio frequency module are operable to support SRS antenna port switching for both the first frequency band and the second frequency band on each of the first antenna, the second antenna, the third antenna, and the fourth antenna. In accordance with several embodiments, the first broadband radio frequency module and the second broadband radio frequency module are operable to support SRS antenna port switching without any signal paths between the first broadband radio frequency module and the second broadband radio frequency module. According to various embodiments, the first broadband radio frequency module and the second broadband radio frequency module are operable to support dual uplink MIMO communications for both the first frequency band and the second frequency band. In accordance with a number of embodiments, the front-end system further includes a first antenna-plexer coupled between the first broadband radio frequency module and the first antenna, a second antenna-plexer coupled between the first broadband radio frequency module and the second antenna, a third antenna-plexer coupled between the second broadband radio frequency module and the third antenna, and a fourth antenna-plexer coupled between the second broadband radio frequency module and the fourth antenna.

In several embodiments, the front-end system further includes a third broadband radio frequency module including a fifth receive circuit selectively operable in the first frequency band or the second frequency band and a sixth receive circuit selectively operable in the first frequency band or the second frequency band, and a fourth broadband radio frequency module including a seventh receive circuit selectively operable in the first frequency band or the second frequency band and an eighth receive circuit selectively operable in the first frequency band or the second frequency band. According to a number of embodiments, the mobile device further includes a first antenna coupled to the first broadband radio frequency module, a second antenna coupled to the second broadband radio frequency module, a third antenna coupled to the third broadband radio frequency module, and a fourth antenna coupled to the fourth broadband radio frequency module. In accordance with some embodiments, the first broadband radio frequency module, the second broadband radio frequency module, the third broadband radio frequency module, and the fourth broadband radio frequency module support concurrent carrier aggregation for the first frequency band and the second frequency band. According to various embodiments, the second broadband radio frequency module, the third broadband radio frequency module, and the fourth broadband radio frequency do not transmit in the first frequency band or the second frequency band. In accordance with a number of embodiments, the first broadband radio frequency module, the second broadband radio frequency module, the third broadband radio frequency module, and the fourth broadband radio frequency module support SRS antenna port switching for both the first frequency band and the second frequency band on each of the first antenna, the second antenna, the third antenna, and the fourth antenna. According to some embodiments, the first broadband radio frequency module is connected to the second broadband radio frequency module by a first SRS signal route, to the third broadband radio frequency module by a second SRS signal route, and to the fourth broadband radio frequency module by a third SRS signal route. In accordance with various embodiments, the third broadband radio frequency module further includes a second transmit circuit selectively operable in the first frequency band or the second frequency band. According to a number of embodiments, the first broadband radio frequency module and the third broadband radio frequency module are operable to support SRS antenna port switching for both the first frequency band and the second frequency band on each of the first antenna, the second antenna, the third antenna, and the fourth antenna. In accordance with some embodiments, the first broadband radio frequency module is coupled to the second broadband radio frequency module by a first SRS signal path, and the third broadband radio frequency module is coupled to the fourth broadband radio frequency module by a second SRS signal path. According to various embodiments, the first broadband radio frequency module and the third broadband radio frequency module are operable to support dual MIMO communications for both the first frequency band and the second frequency band. In accordance with a number of embodiments, the mobile device further includes a first antenna-plexer coupled between the first broadband radio frequency module and the first antenna port, a second antenna-plexer coupled between the second broadband radio frequency module and the second antenna port, a third antenna-plexer coupled between the third broadband radio frequency module and the third antenna port, and a fourth antenna-plexer coupled between the fourth broadband radio frequency module and the fourth antenna port.

In various embodiments, the first frequency band is a first fifth generation band and the second frequency band is a second fifth generation frequency band.

In several embodiments, the first frequency band is n77 and the second frequency band is n79.

In some embodiments, the first frequency band is B41 and the second frequency band is n77.

In various embodiments, the first frequency band is n41 and the second frequency band is n78.

In several embodiments, the first frequency band is 5 gigahertz WiFi and the second frequency band is 6 gigahertz WiFi.

In some embodiments, the first transmit circuit includes a bandwidth controllable power amplifier and a bandwidth controllable transmit filter.

In various embodiments, the first receive circuit includes a bandwidth controllable low noise amplifier and a bandwidth controllable receive filter.

In several embodiments, the front-end system further includes a radio frequency power amplifier module configured to transmit in a third frequency band, the first broadband radio frequency module and the radio frequency power amplifier module configured to operate with a shared power amplifier supply voltage.

In certain embodiments, the present disclosure relates to a method of operating a front-end system of a mobile device. The method includes selectively operating a first transmit circuit of a first broadband radio frequency module in a first frequency band or a second frequency band, selectively operating a first receive circuit of the first broadband radio frequency module in the first frequency band or the second frequency band, selectively operating a second receive circuit of the first broadband radio frequency module in the first frequency band or the second frequency band, selectively operating a second transmit circuit of a second broadband radio frequency module in the first frequency band or the second frequency band, selectively operating a third receive circuit of the second broadband radio frequency module in the first frequency band or the second frequency band, and selectively operating a fourth receive circuit of the second broadband radio frequency module in the first frequency band or the second frequency band.

In some embodiments, the method further includes communicating on a first antenna using the first broadband radio frequency module, communicating on a second antenna using the first broadband radio frequency module, communicating on a third antenna using the second broadband radio frequency module, and communicating on a fourth antenna using the second broadband radio frequency module. According to a number of embodiments, the second broadband radio frequency module does not transmit in the first frequency band or the second frequency band. In accordance with several embodiments, the method further includes supporting non-current carrier aggregation in the first frequency band and the second frequency band using the first broadband radio frequency module and the second broadband radio frequency module. According to various embodiments, the method further includes supporting SRS antenna port switching for both the first frequency band and the second frequency band on each of the first antenna, the second antenna, the third antenna, and the fourth antenna using the first broadband radio frequency module and the second broadband radio frequency module. In accordance with a number of embodiments, the first broadband radio frequency module is connected to the second broadband radio frequency module by a signal route to support SRS antenna port switching. According to several embodiments, the method further includes selectively operating a second transmit circuit of the second broadband radio frequency module in the first frequency band or the second frequency band. In accordance with various embodiments, the method further includes supporting non-concurrent carrier aggregation for the first frequency band and the second frequency band using the first broadband radio frequency module and the second broadband radio frequency module. According to a number of embodiments, the method further includes using the first broadband radio frequency module and the second broadband radio frequency module to support SRS antenna port switching for both the first frequency band and the second frequency band on each of the first antenna, the second antenna, the third antenna, and the fourth antenna. In accordance with several embodiments, the method further includes supporting SRS antenna port switching without any signal paths between the first broadband radio frequency module and the second broadband radio frequency module. According to various embodiments, using the first broadband radio frequency module and the second broadband radio frequency module to support dual uplink MIMO communications for both the first frequency band and the second frequency band.

In several embodiments, the method further includes selectively operating a fifth receive circuit of a third broadband radio frequency module including in the first frequency band or the second frequency band, selectively operating a sixth receive circuit of the third broadband radio frequency module including in the first frequency band or the second frequency band, selectively operating a seventh receive circuit of a fourth broadband radio frequency module including in the first frequency band or the second frequency band, and selectively operating an eighth receive circuit of the fourth broadband radio frequency module including in the first frequency band or the second frequency band. According to a number of embodiments, the method further includes communicating on a first antenna using the first broadband radio frequency module, communicating on a second antenna using the second broadband radio frequency module, communicating on a third antenna using the third broadband radio frequency module, and communicating on a fourth antenna using the fourth broadband radio frequency module. In accordance with several embodiments, the method further includes using the first broadband radio frequency module, the second broadband radio frequency module, the third broadband radio frequency module, and the fourth broadband radio frequency module to support concurrent carrier aggregation for the first frequency band and the second frequency band. According to various embodiments, the second broadband radio frequency module, the third broadband radio frequency module, and the fourth broadband radio frequency do not transmit in the first frequency band or the second frequency band. In accordance with a number of embodiments, the method further includes using the first broadband radio frequency module, the second broadband radio frequency module, the third broadband radio frequency module, and the fourth broadband radio frequency module to support SRS antenna port switching for both the first frequency band and the second frequency band on each of the first antenna, the second antenna, the third antenna, and the fourth antenna. According to several embodiments, the first broadband radio frequency module is connected to the second broadband radio frequency module by a first SRS signal route, to the third broadband radio frequency module by a second SRS signal route, and to the fourth broadband radio frequency module by a third SRS signal route. In accordance with various embodiments, the method further includes selectively operating a second transmit circuit of the third broadband radio frequency module in the first frequency band or the second frequency band. According to a number of embodiments, the method further includes using the first broadband radio frequency module and the third broadband radio frequency module to support SRS antenna port switching for both the first frequency band and the second frequency band on each of the first antenna, the second antenna, the third antenna, and the fourth antenna. In accordance with several embodiments, the first broadband radio frequency module is coupled to the second broadband radio frequency module by a first SRS signal path, and the third broadband radio frequency module is coupled to the fourth broadband radio frequency module by a second SRS signal path. According to various embodiments, the method further includes using the first broadband radio frequency module and the third broadband radio frequency module to support dual MIMO communications for both the first frequency band and the second frequency band.

In some embodiments, the first frequency band is a first fifth generation band and the second frequency band is a second fifth generation frequency band.

In various embodiments, the first frequency band is n77 and the second frequency band is n79.

In several embodiments, the first frequency band is B41 and the second frequency band is n77.

In a number of embodiments, the first frequency band is n41 and the second frequency band is n78.

In various embodiments, the first frequency band is 5 gigahertz WiFi and the second frequency band is 6 gigahertz WiFi.

In several embodiments, the first transmit circuit includes a bandwidth controllable power amplifier and a bandwidth controllable transmit filter.

In some embodiments, the first receive circuit includes a bandwidth controllable low noise amplifier and a bandwidth controllable receive filter.

In various embodiments, the method further includes transmitting in a third frequency band using a radio frequency power amplifier module, and sharing a power amplifier supply voltage between the first broadband radio frequency module and the radio frequency power amplifier module.

In certain embodiments, the present disclosure relates to an antenna switch, a filter coupled to an antenna port through the antenna switch, a filter reuse switch, a power amplifier having an output coupled to the filter through the filter reuse switch, and a low noise amplifier having an input coupled to the filter through the filter reuse switch.

In some embodiments, the low noise amplifier, the filter reuse switch, the filter, and the antenna switch are implemented on a receive module, and the power amplifier is implemented on a power amplifier module.

According to several embodiments, the low noise amplifier and the antenna switch are implemented on a receive module, and the power amplifier, the filter reuse switch, and the filter are implemented on a power amplifier module.

In various embodiments, the filter is a first bandpass filter for a first frequency band.

In several embodiments, the power amplifier is operable over the first frequency band and a second frequency band. According to a number of embodiments, the radio frequency front-end system further includes a second bandpass filter for the second frequency band, the output of the power amplifier connected to the first bandpass filter in a first state of the filter reuse switch, and to the second bandpass filter in a second state of the filter reuse switch. In accordance with various embodiments, the radio frequency front-end system further includes a second bandpass filter for the second frequency band and a transmit/receive switch, the output of the power amplifier connected to the first bandpass filter in a first state of the transmit/receive switch, and to the second bandpass filter in a second state of the transmit/receive switch. According to some embodiments, the first frequency band is n41 and the second frequency band is n78. In accordance with a number of embodiments, the first frequency band is n77 and the second frequency band is n79. According to several embodiments, the first frequency band is B41 and the second frequency band is n77. In accordance with various embodiments, the first frequency band is 5 gigahertz WiFi and the second frequency band is 6 gigahertz WiFi.

In certain embodiments, the present disclosure relates to a mobile device. The mobile device includes an antenna, and a radio frequency front-end system including an antenna switch, a filter coupled to the antenna through the antenna switch, a filter reuse switch, a power amplifier having an output coupled to the filter through the filter reuse switch, and a low noise amplifier having an input coupled to the filter through the filter reuse switch.

In some embodiments, the low noise amplifier, the filter reuse switch, the filter, and the antenna switch are implemented on a receive module, and the power amplifier is implemented on a power amplifier module. According to various embodiments, the low noise amplifier and the antenna switch are implemented on a receive module, and the power amplifier, the filter reuse switch, and the filter are implemented on a power amplifier module. In accordance with several embodiments, the filter is a first bandpass filter for a first frequency band. In accordance with various embodiments, the power amplifier is operable over the first frequency band and a second frequency band. In some embodiments, the front-end system further includes a second bandpass filter for the second frequency band, the output of the power amplifier connected to the first bandpass filter in a first state of the filter reuse switch, and to the second bandpass filter in a second state of the filter reuse switch. According to a number of embodiments, the front-end system further includes a second bandpass filter for the second frequency band and a transmit/receive switch, the output of the power amplifier connected to the first bandpass filter in a first state of the transmit/receive switch, and to the second bandpass filter in a second state of the transmit/receive switch. In accordance with several embodiments, the first frequency band is n41 and the second frequency band is n78. According to various embodiments, the first frequency band is n77 and the second frequency band is n79. In accordance with several embodiments, the first frequency band is B41 and the second frequency band is n77. According to a number of embodiments, the first frequency band is 5 gigahertz WiFi and the second frequency band is 6 gigahertz WiFi.

In certain embodiments, the present disclosure relates to a method of filter reuse in a mobile device. The method includes generating a radio frequency transmit signal using a power amplifier, operating a filter reuse switch in a first state to couple an output of the power amplifier to a filter, providing a filtered transmit signal from the filter to an antenna through an antenna switch, filtering a radio frequency receive signal received from the antenna switch using the filter, and operating the filter reuse switch in a second state to couple an input of a low noise amplifier to the filter.

In some embodiments, the filter is a first bandpass filter for a first frequency band. According to a number of embodiments, the method further includes operating the power amplifier over the first frequency band and a second frequency band. In accordance with several embodiments, the method further includes connecting the output of the power amplifier to a second bandpass filter for the second frequency band in a third state of the filter reuse switch.

In several embodiments, the method further includes connecting the output of the power amplifier to a second bandpass filter for the second frequency band in a first state of a transmit/receive switch, and connecting the output of the power amplifier to the filter reuse switch in a second state of the transmit/receive switch.

In various embodiments, the first frequency band is n41 and the second frequency band is n78.

In several embodiments, the first frequency band is n77 and the second frequency band is n79.

In some embodiments, the first frequency band is B41 and the second frequency band is n77.

In various embodiments, the first frequency band is 5 gigahertz WiFi and the second frequency band is 6 gigahertz WiFi. According to a number of embodiments, the low noise amplifier, the filter reuse switch, the filter, and the antenna switch are implemented on a receive module, and the power amplifier is implemented on a power amplifier module. In accordance with some embodiments, the low noise amplifier and the antenna switch are implemented on a receive module, and the power amplifier, the filter reuse switch, and the filter are implemented on a power amplifier module.

DETAILED DESCRIPTION OF EMBODIMENTS

Figure 1:
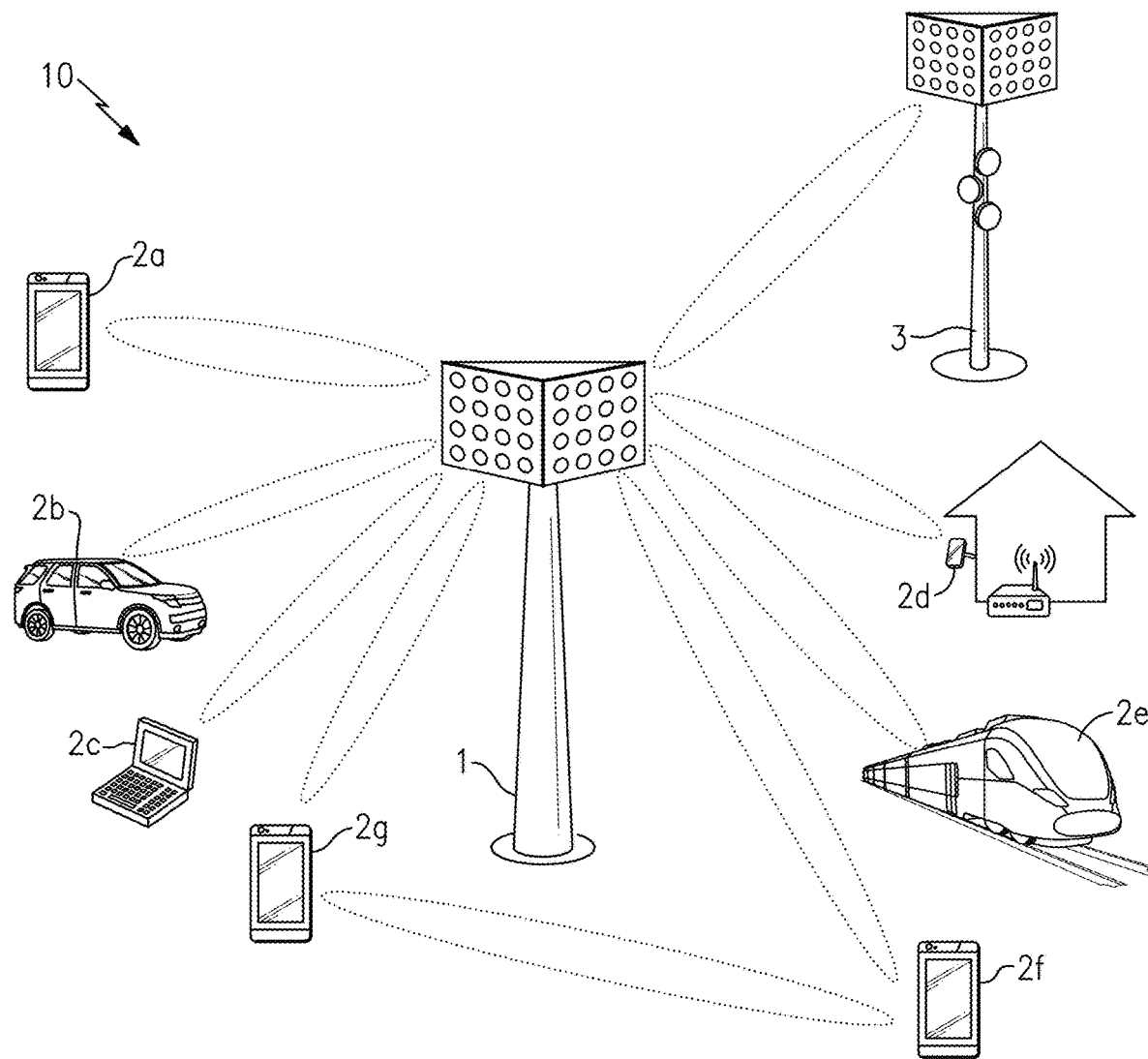
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 20.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
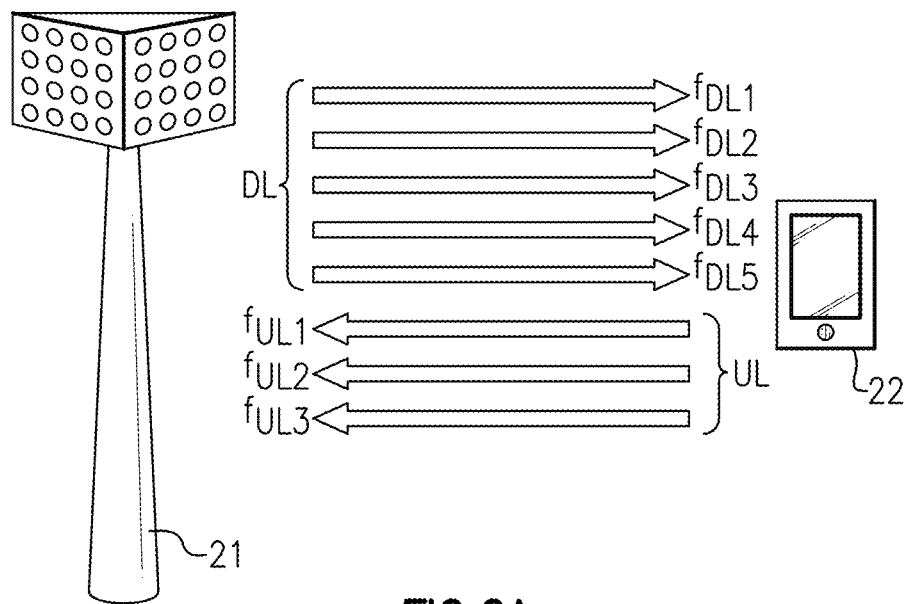
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
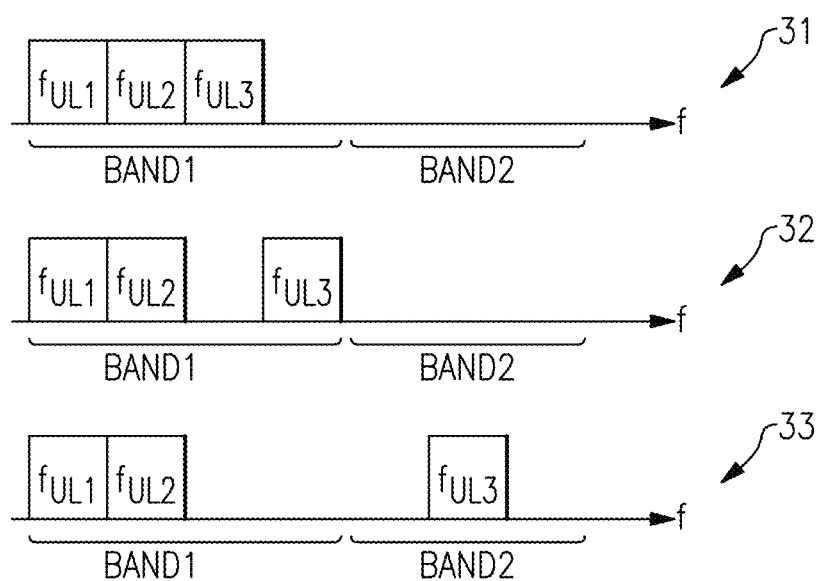
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers full and $f_{UL2}$ of a first frequency band BAND1 with component carrier $f_{UL3}$ of a second frequency band BAND2.

Figure 2C:
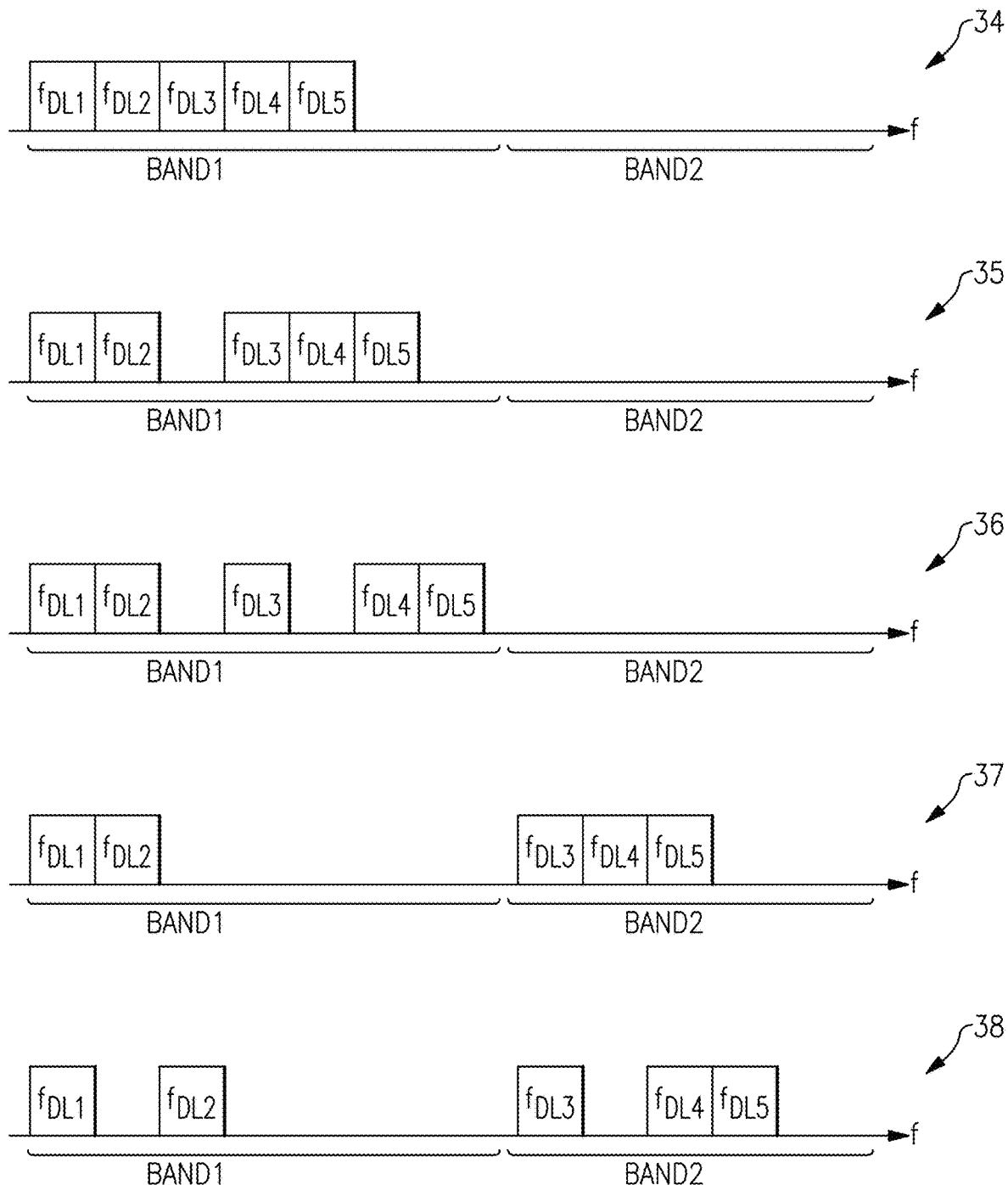
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
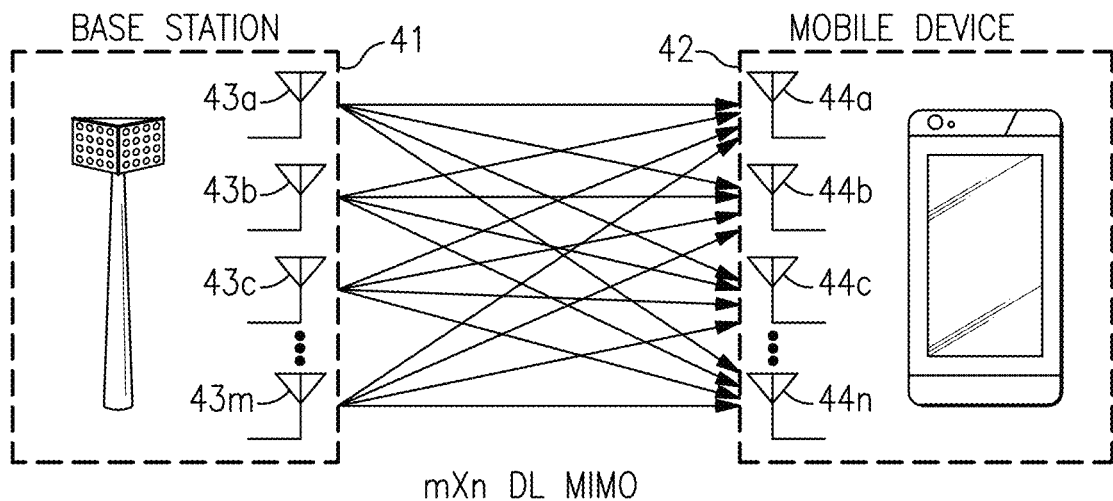
FIG. 3A is a schematic diagram of one example of a downlink channel using multi-input and multi-output (MIMO) communications.
Figure 3B:
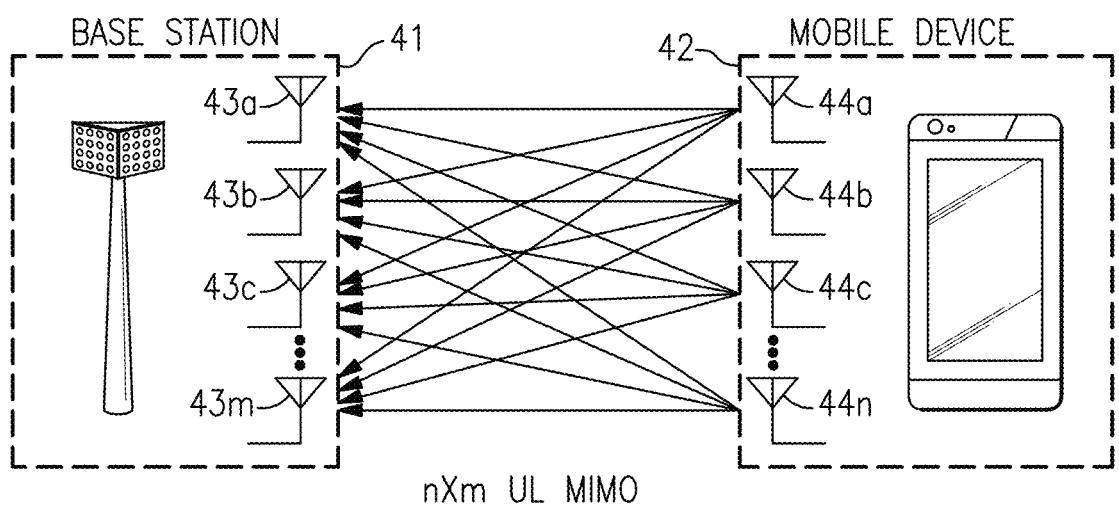
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas.

Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
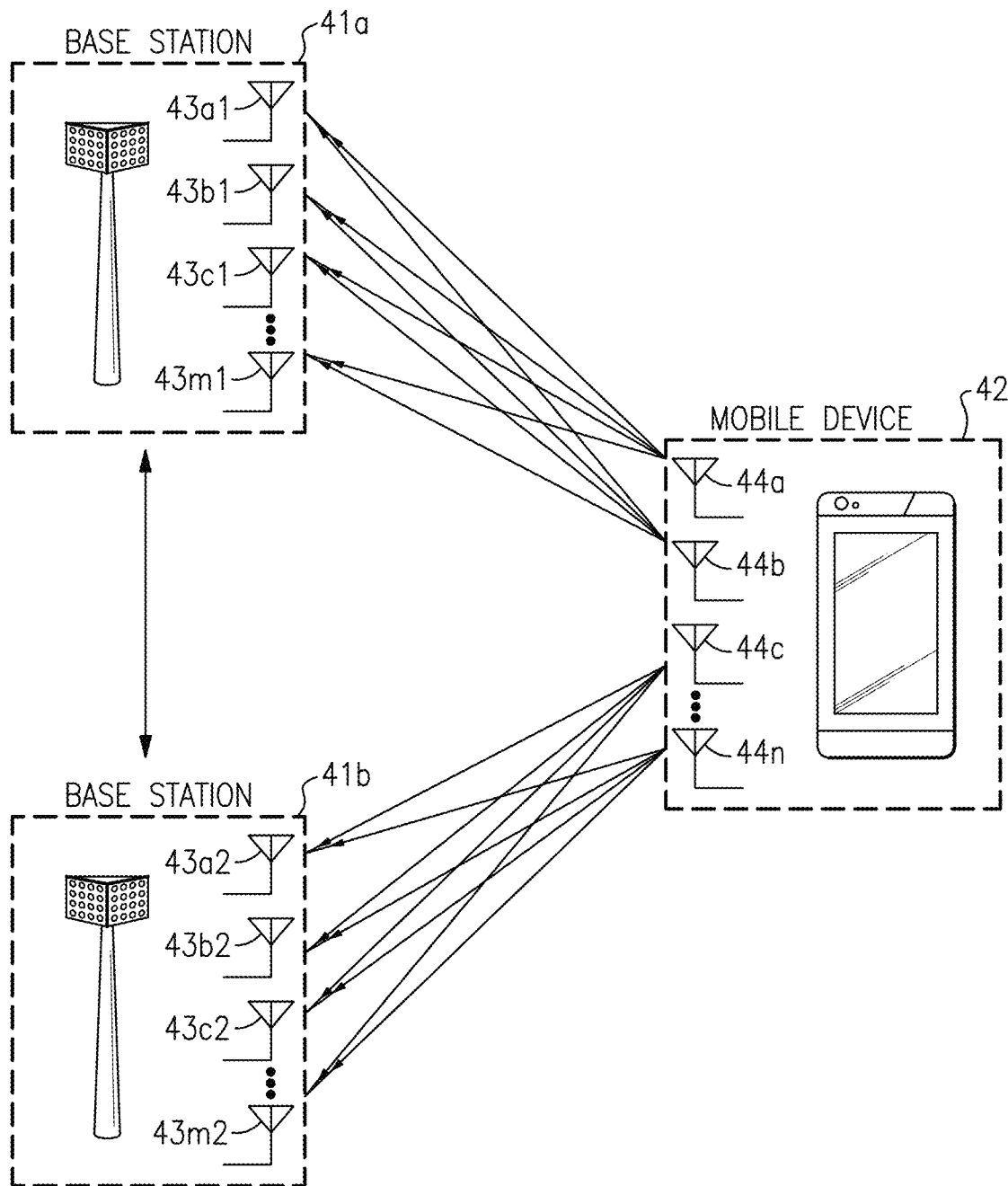
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Examples of Broadband Architectures for RF Front-End Systems

A radio frequency (RF) communication device can include multiple antennas for supporting wireless communications. Additionally, the RF communication device can include a radio frequency front-end (RFFE) system for processing signals received from and transmitted by the antennas. The RFFE system can provide a number of functions, including, but not limited to, signal filtering, signal partitioning and combining, controlling component connectivity to the antennas, and/or signal amplification.

RFFE systems can be used to handle RF signals of a wide variety of types, including, but not limited to, wireless local area network (WLAN) signals, Bluetooth signals, and/or cellular signals. RFFE systems are also referred to herein as RF front-end systems.

RFFE systems can be used to process signals of a wide range of frequencies. For example, certain RFFE systems can operate using one or more low bands (for example, RF signal bands having a frequency content of 1 GHz or less, also referred to herein as LB), one or more mid bands (for example, RF signal bands having a frequency content between 1 GHz and 2.3 GHz, also referred to herein as MB), one or more high bands (for example, RF signal bands having a frequency content between 2.3 GHz and 3 GHz, also referred to herein as HB), and one or more ultrahigh bands (for example, RF signal bands having a frequency content between 3 GHz and 7.125 GHz, also referred to herein as UHB).

RFFE systems can be used in a wide variety of RF communication devices, including, but not limited to, smartphones, base stations, laptops, handsets, wearable electronics, and/or tablets.

An RFFE system can be implemented to support a variety of features that enhance bandwidth and/or other performance characteristics of the RF communication device in which the RFFE system is incorporated.

In one example, an RFFE system is implemented to support carrier aggregation, thereby providing flexibility to increase peak data rates. Carrier aggregation can be used for both FDD and TDD, and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

In another example, an RFFE system is implemented to support multi-input and multi-output (MIMO) communications to increase throughput and enhance mobile broadband service. MIMO communications use multiple antennas for communicating multiple data streams over a single radio frequency channel. MIMO communications benefit from higher signal to noise ratio, improved coding, and/or reduced signal interference due to spatial multiplexing differences of the radio environment. MIMO order refers to a number of separate data streams sent or received. For instance, a MIMO order for downlink communications can be described by a number of transmit antennas of a base station and a number of receive antennas for user equipment (UE), such as a mobile device.

RFFE systems that support carrier aggregation and multi-order MIMO can be used in RF communication devices that operate with wide bandwidth. For example, such RFFE systems can be used in applications servicing multimedia content streaming at high data rates. For example, 5G technology seeks to achieve high peak data rates above 10 Gbps. Certain 5G high-speed communications can be referred to herein as Enhanced Multi-user Broadband (eMBB).

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

In certain implementations, the RFFE architectures herein support EN-DC, uplink carrier aggregation, downlink carrier aggregation, uplink MIMO (for instance, 2×2 TX MIMO), and/or downlink MIMO (for instance, 4×4 RX MIMO). Moreover, certain implementations support transmit antenna swapping and full sounding resource signaling (SRS) support for MIMO antennas.

The RFFE systems herein include modules having bandwidth controllable components, such as amplifier and filters. By implementing the modules with bandwidth control, the same module can be used for operation of multiple frequency bands including a first frequency band (referred to generally herein as band X or Bx) and a second frequency band (referred to generally herein as band Y or By). Thus, when implementing features such as carrier aggregation, MIMO, and/or SRS for supporting Bx and By, the total number of modules used can be reduced and/or additional feature support can be provided compared to an implementation in which each module supports a single frequency band.

The frequency bands supported by the bandwidth controllable modules (for example, Bx and By) can correspond to a wide variety of frequency bands, including 5G frequency bands. In a first example, Bx corresponds to Band n77 (about 3.3 GHz to about 4.2 GHz) while By corresponds to Band n79 (about 4.4 GHz to about 5.0 GHz). In a second example, Bx corresponds to Band n41 (about 2496 MHz to about 2690 MHz) while By corresponds to Band n78 (about 3.3 GHz to about 3.8 GHz). In a third example, Bx corresponds to 5 GHz WiFi (about 5.15 GHz to about 5.85 GHz) while By corresponds to 6 GHz WiFi (about 5.925 GHz to about 7.125 GHz). Although various examples of frequency bands have been provided, the teachings herein are applicable to other frequency bands.

Figure 4:
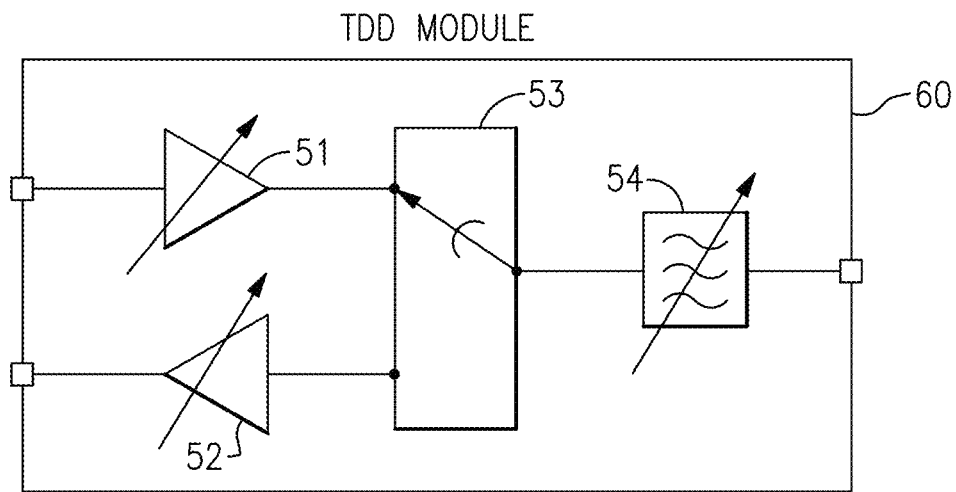
FIG. 4 is a schematic diagram of a time-division duplexing (TDD) module according to one embodiment.

FIG. 4 is a schematic diagram of a TDD module 60 according to one embodiment. The TDD module 60 includes a bandwidth controllable power amplifier (PA) 51, a bandwidth controllable low noise amplifier (LNA) 52, a transmit/receive (T/R) switch 53, and a bandwidth controllable filter 54.

The TDD module 60 is tunable or otherwise programmable to operate with different frequencies over the same signal paths. Thus, the TDD module 60 is operable over herein over multiple frequency bands, including a first frequency band (Bx) and a second frequency band (By). As noted above, Bx and By can correspond to various frequency band combinations including, but not limited to, n77 and n79, n41 and n78, or 5 GHz WiFi and 6 GHz WiFi. The TDD module 60 can be instructed to operate with a particular frequency band in any suitable way, including, but not limited to, by providing control data to the TDD module 60 over an interface or bus.

Thus, rather that necessitating separate transmit (Tx) paths (and corresponding Tx components) and separate receive (Rx) paths (and corresponding Rx components), shared circuitry is used for both frequency bands.

Such consolidation can reduce size and cost of an overall front-end solution. Moreover, implementing the module in this manner can enable two such modules to support uplink MIMO in either Bx or By. Thus a significant reduction in the size and cost for this feature support can be provided, since two broadband TDD modules can serve the role of four single band modules (two for Bx uplink MIMO and two for By uplink MIMO).

Figure 5A:
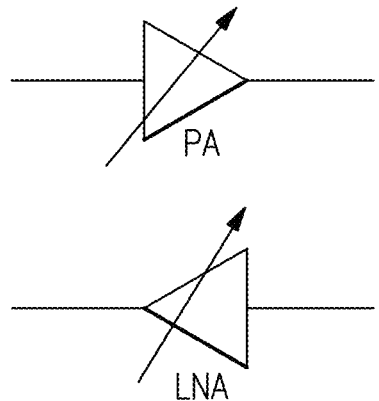
FIG. 5A is a schematic diagram of one example of bandwidth control for an amplifier.
Figure 5A:
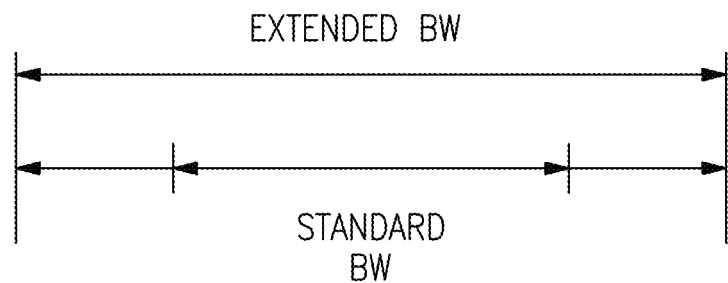

FIG. 5A is a schematic diagram of one example of bandwidth control for an amplifier. The example of bandwidth control is applicable to a PA or an LNA.

As shown in FIG. 5A, a broadband amplifier (for instance, PA/LNA) can have significantly extended passband bandwidth coverage relative to a standard bandwidth amplifier. Additionally, the broadband amplifier includes re-programmability for coverage of Bx or By.

Moreover, broadband amplifier design extends flat gain, linearity and/or DC efficiency across a wider passband bandwidth range. Additionally, such wider passband bandwidth range can be supplemented by programmable adjustment to re-center/relocate the passband across a new range of frequencies.

Figure 5B:
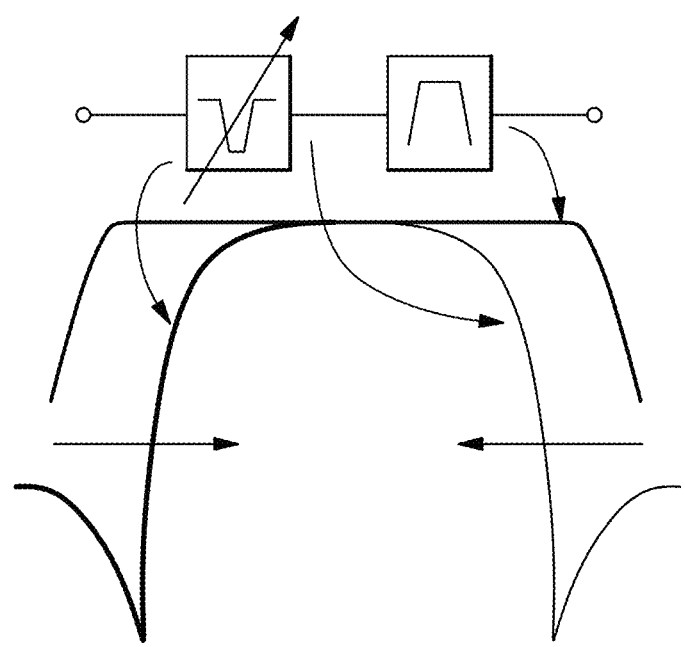
FIG. 5B is a schematic diagram of one example of bandwidth control for a filter.

FIG. 5B is a schematic diagram of one example of bandwidth control for a filter. In the example shown, a tunable notch filter is cascaded with a fixed frequency filter.

In certain implementations, the bandwidth of a filter is set using a fixed filter that controls a fixed band-edge corner frequency, while a tunable filter enables switch-programming adjustment of corner frequency to move in or out depending on desired bandwidth, which can depend not only on the desired frequency band but also on out-of-band attenuation desired for coexistence.

Aspects of tunable filters can include switching in or out notch filters that move attenuation centered at the notch frequencies in or out. Moreover, such switching can relocate corner frequencies in or out to move band edges and adjust attenuations for out-of-band coexistence considerations.

Figure 5C:
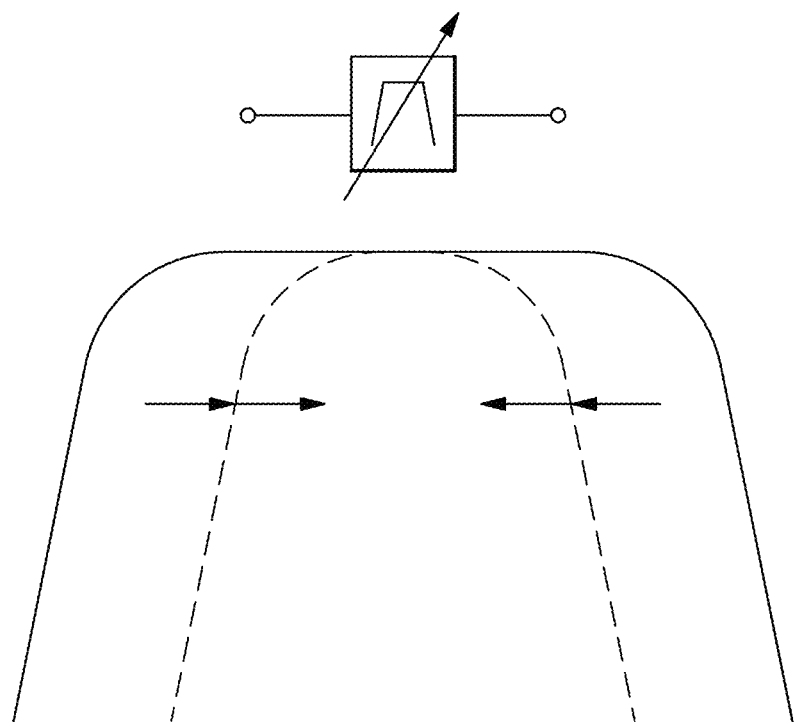
FIG. 5C is a schematic diagram of another example of bandwidth control for a filter.

FIG. 5C is a schematic diagram of another example of bandwidth control for a filter. In this example, both band edges of the filter are controllable.

With reference to FIGS. 4-5C, switch re-programmable/tunable filter adjusting, PA adjustments, and LNA adjustments enable not only broadband coverage in one band (Bx), but also adjustability to enable use for a second band (By).

Figure 6A:
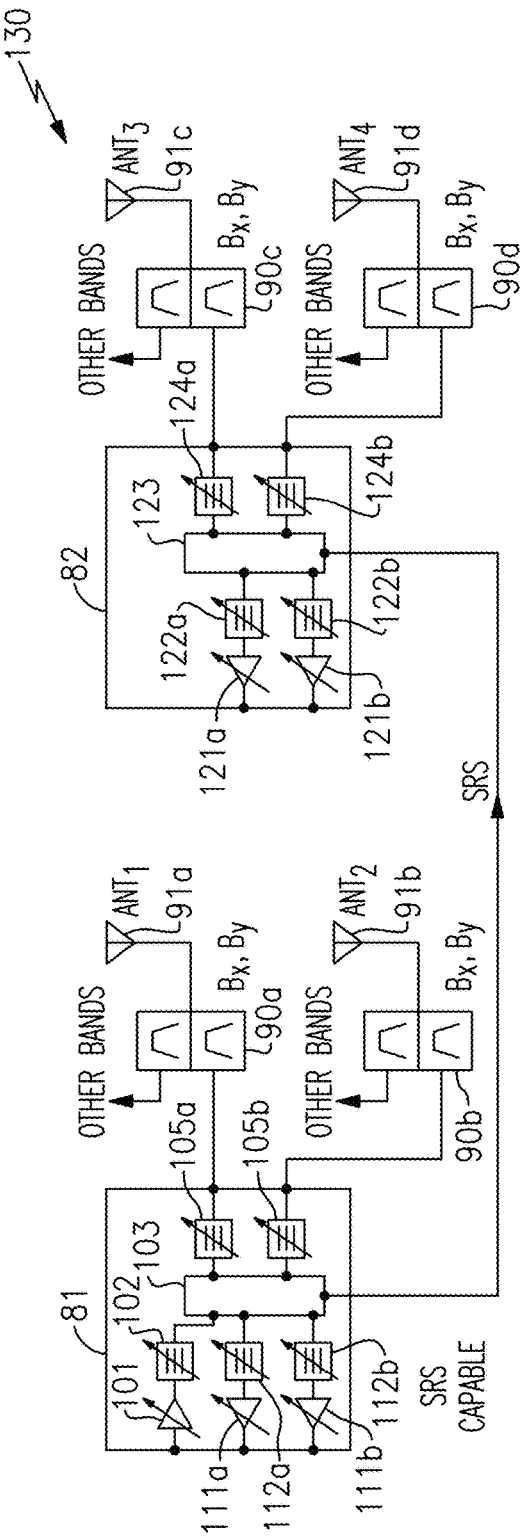
FIG. 6A is a schematic diagram of a front-end system according to one embodiment.

FIG. 6A is a schematic diagram of a front-end system 130 according to one embodiment. The front-end system 130 includes a broadband T/R module 81, a broadband Rx module 82, a first diplexer 90*a*, a second diplexer 90*b*, a third diplexer 90*c*, and a fourth diplexer 90*d*. Connections of the front-end system 130 to a first antenna 91*a*, a second antenna 91*b*, a third antenna 91*c*, and a fourth antenna 91*d* are depicted.

In the illustrated embodiment, the broadband T/R module 81 includes a first bandwidth controllable PA 101, a bandwidth controllable Tx filter 102, a switch 103, a first bandwidth controllable Tx/Rx filter 105*a*, a second bandwidth controllable Tx/Rx filter 105*b*, a first bandwidth controllable LNA 111*a*, a first bandwidth controllable Rx filter 112*a*, a second bandwidth controllable LNA 111*b*, and a second bandwidth controllable Rx filter 112*b*. In one example, the broadband Tx/Rx module 81 is a Bx/By Tx-capable TDD PAMiF.

The front-end system 130 includes a Tx path through the PA 101 and that is operable in Bx or By. The front-end system 130 further includes a first Rx path through the first LNA 111*a* and that is operable in Bx or By, and a second Rx path through the second LNA 11*b* and that is operable in Bx or By.

With continuing reference to FIG. 6A, the broadband Rx module 82 includes a first bandwidth controllable LNA 121*a*, a first bandwidth controllable Rx filter 122*a*, a second bandwidth controllable LNA 121*b*, a second bandwidth controllable Rx filter 122*b*, a switch 123, a first bandwidth controllable Tx/Rx filter 124*a*, and a second bandwidth controllable Tx/Rx filter 124*b*. In one example, the broadband Rx module 82 is a Bx/By Rx-capable TDD diversity switch Rx module (DSM).

The front-end system 130 includes a third Rx path through the first LNA 121*a* and that is operable in Bx or By, and a fourth Rx path through the second LNA 121*b* and that is operable in Bx or By.

By configuring the Tx and Rx paths for operation in Bx or By, different feature support can be provided using the front-end system. In a first example, the first Rx path, the second Rx path, the third Rx path, and the fourth Rx path can be tuned for operation in Bx to provide support for 4×4 downlink MIMO for Bx. In a second example, the first Rx path, the second Rx path, the third Rx path, and the fourth Rx path can be tuned for operation in By to provide support for 4×4 downlink MIMO for By.

The front-end system 130 can also support various carrier aggregation (CA) features, such as non-CA in which Bx and By are not concurrent and architecture to share a common trace and antenna-plexer filter.

Furthermore, SRS antenna port switching is supported in the front-end system 130 of FIG. 6A. For example, the power amplifier 101 can provide a transmit signal to any of the antennas. Thus, not only can the power amplifier 101 transmit on the first antenna 91a and the second antenna 91b, but also on the third antenna 91c and the fourth antenna 91d by way of an SRS path from the switch 103 to the switch 123.

Figure 6B:
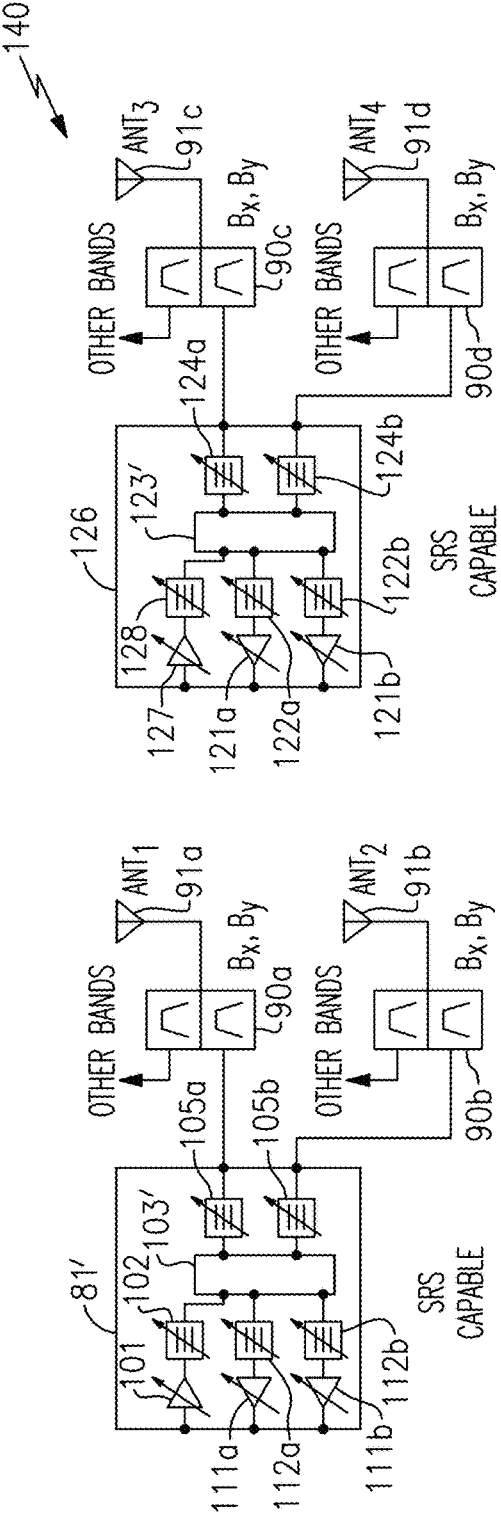
FIG. 6B is a schematic diagram of a front-end system according to another embodiment.

FIG. 6B is a schematic diagram of a front-end system 140 according to another embodiment. The front-end system 140 includes a first broadband T/R module 81', a second broadband T/R module 126, a first diplexer 90a, a second diplexer 90b, a third diplexer 90c, and a fourth diplexer 90d. Connections of the front-end system 130 to a first antenna 91a, a second antenna 91b, a third antenna 91c, and a fourth antenna 91d are depicted.

The first broadband T/R module 81' of FIG. 6B is similar to the broadband T/R module 81 of FIG. 6A, except that the first broadband T/R module 81' includes a switch 103' that omits a throw for connecting to an SRS signal path. Since the second broadband T/R module 126 is transmit capable and able to transmit on the third antenna 91c and the fourth antenna 91d, the front-end system 140 can support SRS switching without needing to provide an SRS signal path for the first broadband T/R module 81' to access the third antenna 91c and the fourth antenna 91d.

With continuing reference to FIG. 6B, the second broadband T/R module 126 includes a bandwidth controllable power amplifier 127, a bandwidth controllable Tx filter 128, a switch 123', a first bandwidth controllable Tx/Rx filter 124a, a second bandwidth controllable Tx/Rx filter 124b, a first bandwidth controllable LNA 121a, a second bandwidth controllable LNA 121b, a first bandwidth controllable Rx filter 122a, and a second bandwidth controllable Rx filter 122b.

In comparison to the front-end system 130 of FIG. 6A that includes a first transmit path and fourth receive paths each individually configurable in Bx or By, the front-end system 140 of FIG. 6B further includes a second transmit path through the PA 127 that is configurable in Bx or By.

By including the additional transmit path, 2× uplink MIMO is supported by tuning the first Tx path and the second Tx path to Bx or By. Thus, the front-end system 140 of FIG. 6B operates not only with the functionality described earlier with respect to the front-end system 130 of FIG. 6A, but also with 2× uplink MIMO support for Bx and By.

Figure 6C:
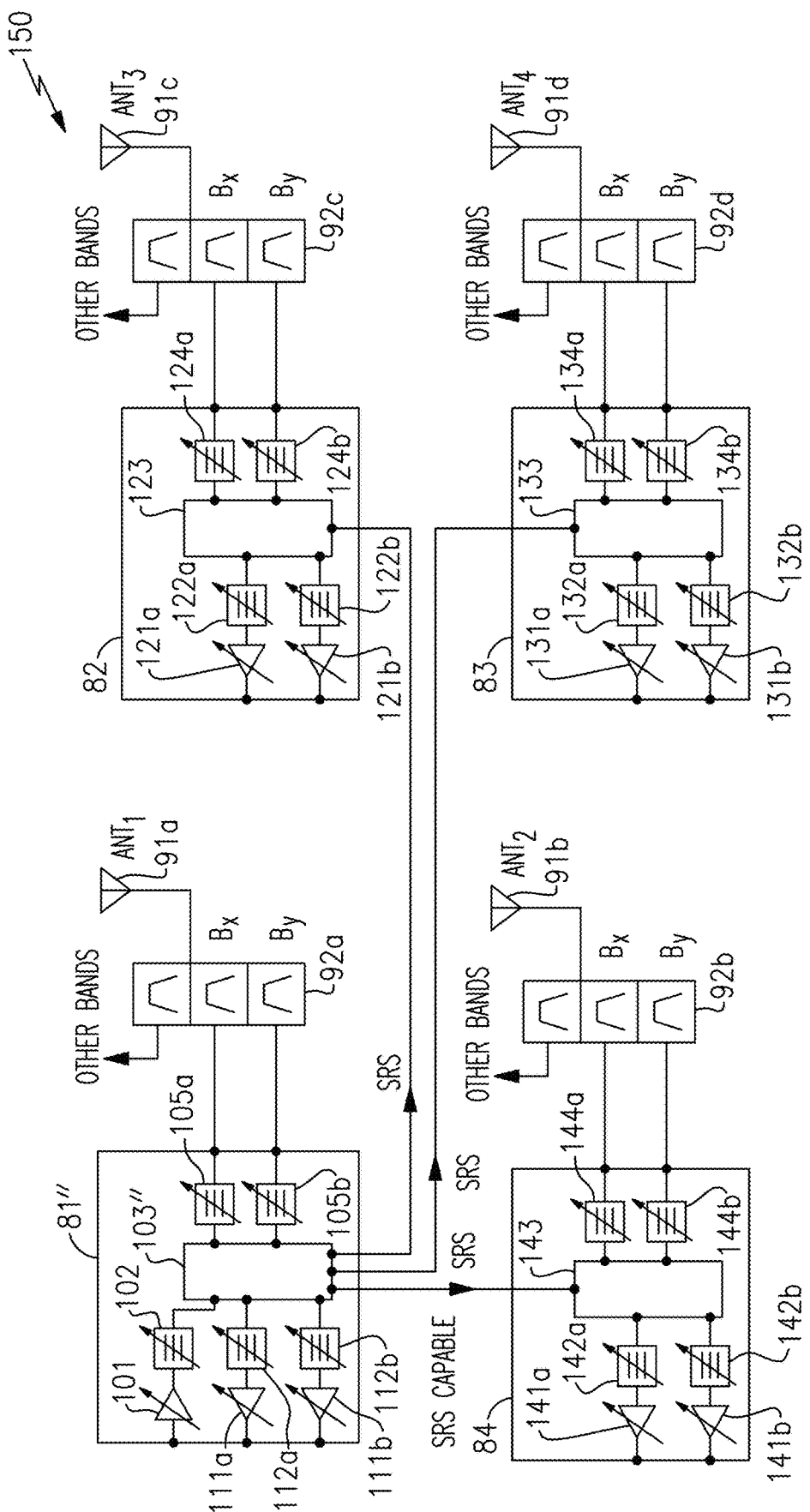
FIG. 6C is a schematic diagram of a front-end system according to another embodiment.

FIG. 6C is a schematic diagram of a front-end system 150 according to another embodiment. The front-end system 150 includes a broadband T/R module 81", a first broadband Rx module 82, a second broadband Rx module 83, a third broadband Rx module 84, a first diplexer 90a, a second diplexer 90b, a third diplexer 90c, and a fourth diplexer 90d. Connections of the front-end system 150 to a first antenna 91a, a second antenna 91b, a third antenna 91c, and a fourth antenna 91d are depicted.

The broadband T/R module 81" of FIG. 6C is similar to the broadband T/R module 81 of FIG. 6A, except that the broadband T/R module 81" includes a switch 103" providing additional throws. In particular, three SRS signal paths are provided for connecting the power amplifier 101 to the first broadband Rx module 82, the second broadband Rx module 83, or the third broadband Rx module 84. Thus, the power amplifier 101 can transmit on any of the antennas for purposes of SRS antenna switching.

The first broadband Rx module 82 includes a first bandwidth controllable LNA 121a, a first bandwidth controllable Rx filter 122a, a second bandwidth controllable LNA 121b, a second bandwidth controllable Rx filter 122b, a switch 123, a first bandwidth controllable Tx/Rx filter 124a, and a second bandwidth controllable Tx/Rx filter 124b. In one example, the first broadband Rx module 82 is a Bx/By Rx-capable TDD DSM.

The second broadband Rx module 83 and the third broadband Rx module 84 have a similar configuration as the first broadband Rx module 82. For example, the second broadband Rx module 83 includes a first bandwidth controllable LNA 131a, a first bandwidth controllable Rx filter 132a, a second bandwidth controllable LNA 131b, a second bandwidth controllable Rx filter 132b, a switch 133, a first bandwidth controllable Tx/Rx filter 134a, and a second bandwidth controllable Tx/Rx filter 134b. Additionally, the third broadband Rx module 84 includes a first bandwidth controllable LNA 141a, a first bandwidth controllable Rx filter 142a, a second bandwidth controllable LNA 141b, a second bandwidth controllable Rx filter 142b, a switch 143, a first bandwidth controllable Tx/Rx filter 144a, and a second bandwidth controllable Tx/Rx filter 144b.

The front-end system 150 of FIG. 6C supports a wide variety of features including 4×4 downlink MIMO support for Bx and By, and concurrent carrier aggregation support for Bx and By. For example, each of the Rx paths can be tuned to operate in Bx or By to accommodate a wide range of inter-band and intra-band carrier aggregation downlink scenarios.

Figure 6D:
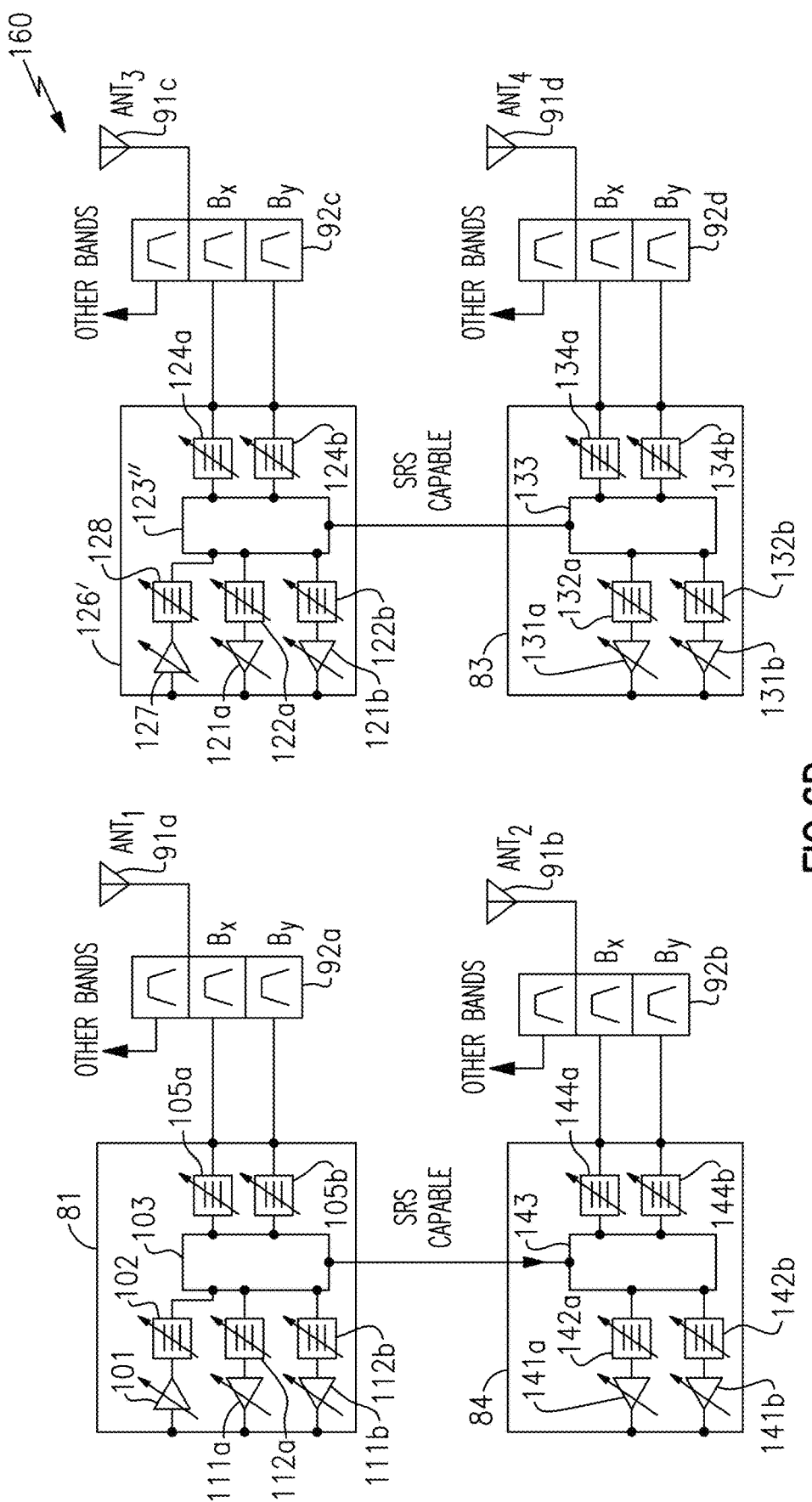
FIG. 6D is a schematic diagram of a front-end system according to another embodiment.

FIG. 6D is a schematic diagram of a front-end system 160 according to another embodiment. The front-end system 160 includes a first broadband T/R module 81, a second broadband T/R module 126', a first broadband Rx module 83, a second broadband Rx module 84, a first triplexer 92a, a second triplexer 92b, a third triplexer 92c, and a fourth triplexer 92d. Connections of the front-end system 160 to a first antenna 91a, a second antenna 91b, a third antenna 91c, and a fourth antenna 91d are depicted.

In comparison to the front-end system 140 of FIG. 6B, the front-end system 160 of FIG. 6D includes modules connected to triplexers as depicted rather than to diplexers as in FIG. 6B. Various antenna-plexer structures can be used in accordance with the teachings herein. Thus, although various examples are depicted, other implementations are possible.

The front-end system 160 of FIG. 6D omits the broadband Rx module 82 of FIG. 6C in favor of including the second broadband T/R module 126'. The second broadband T/R module 126' include a bandwidth controllable power amplifier 127, a bandwidth controllable Tx filter 128, a switch 123", a first bandwidth controllable Tx/Rx filter 124a, a second bandwidth controllable Tx/Rx filter 124b, a first bandwidth controllable LNA 121a, a second bandwidth controllable LNA 121b, a first bandwidth controllable Rx filter 122a, and a second bandwidth controllable Rx filter 122b.

By including two Tx modules capable of transmitting Bx or By, dual (2×) uplink MIMO support is provided for Bx and By. Thus, uplink MIMO, downlink MIMO, carrier aggregation, and SRS antenna port switching are all supported by the front-end system 160 of FIG. 6D.

Figure 6E:
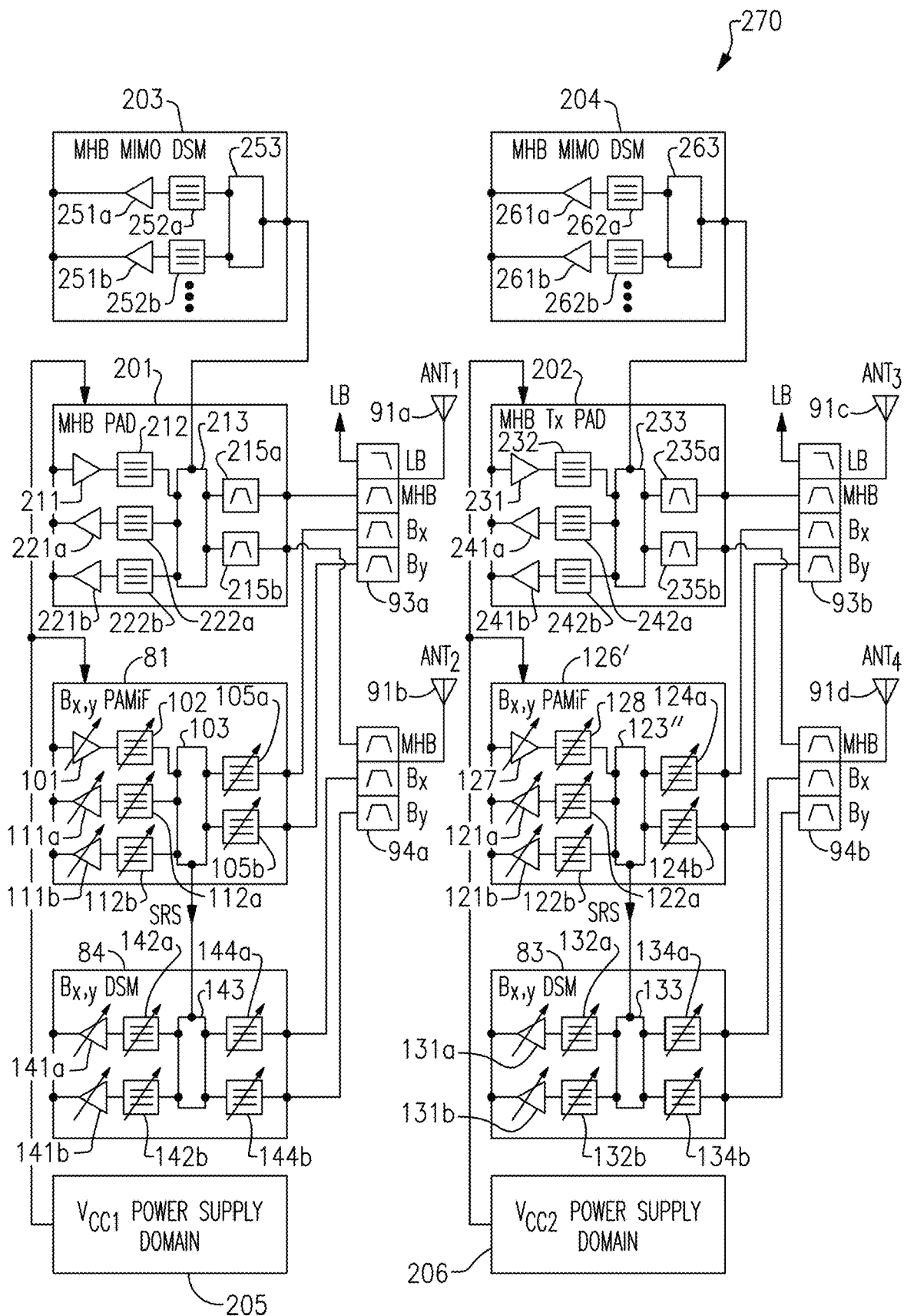
FIG. 6E is a schematic diagram of a front-end system according to another embodiment.

FIG. 6E is a schematic diagram of a front-end system 270 according to another embodiment. The front-end system 270 includes a first broadband T/R module 81, a second broadband T/R module 126', a first broadband Rx module 83, a second broadband Rx module 84, a first quadplexer 93a, a second quadplexer 93b, a first triplexer 94a, a second triplexer 94b, a first MHB power amplifier and duplexing module (PAD) 201, a second MHB PAD 202, a first MHB MIMO DSM 203, a second MHB MIMO DSM 204, a first power management circuit 205, and a second power management circuit 206. Connections of the front-end system 270 to a first antenna 91a, a second antenna 91b, a third antenna 91c, and a fourth antenna 91d are depicted.

The first broadband T/R module 81, the second broadband T/R module 126', the first broadband Rx module 83, and the second broadband Rx module 84 are implemented in a configuration similar to FIG. 6D. Additionally, modules for transmitting MHB are depicted.

In particular, the first MHB PAD 201 includes a PA 211, a Tx filter 212, a switch 213, a first Tx/Rx filter 215a, second Tx/Rx filter 215b, a first LNA 221a, a second LNA 221b, a first Rx filter 222a, and a second Rx filter 222b. Additionally, the second MHB PAD 202 includes a PA 231, a Tx filter 232, a switch 233, a first Tx/Rx filter 235a, second Tx/Rx filter 235b, a first LNA 241a, a second LNA 241b, a first Rx filter 242a, and a second Rx filter 242b. Furthermore, the first MHB MIMO DSM 203 includes a first LNA 251a, a second LNA 251b, a first RX filter 252a, a second RX filter 252b, and a switch 253. Additionally, the second MHB MIMO DSM 204 includes a first LNA 261a, a second LNA 261b, a first RX filter 262a, a second Rx filter 262b, and a switch 263.

Thus, dual uplink MIMO, quad downlink MIMO, carrier aggregation support, and SRS antenna port switching for MHB are provided.

As shown in FIG. 6E, the first power management circuit 205 generates a first power amplifier supply voltage $V_{CC1}$ that is shared by the PA 211 of the first MHB PAD 201 and the PA 101 of the first broadband T/R module 81. Furthermore, the second power management circuit 206 generates a second power amplifier supply voltage $V_{CC2}$ that is shared by the PA 231 of the second MHB PAD 202 and the PA 127 of the second broadband T/R module 126'.

By consolidating Bx and By on the modules 81, 126', 83, and 84, the complexity of power supply connections for power amplifiers is reduced. In particular, fewer Tx paths leads to less connectivity and parasitic load of power management circuits, while increasing flexibility to operate more band combinations with fewer modules.

Examples of Filter Reuse Architectures for RF Front-End Systems

To support 2×2 uplink MIMO and low reverse intermodulation distortion (RIMD) EN-DC intra-band operation, two power amplifier placements can be used. By including two power amplifiers for a particular frequency band, such features can be supporting by using one power amplifier to transmit on one antenna and another power amplifier to transmit on another antenna.

Although using two power amplifier placements can achieve such functionality, the second power amplifier placement is often integrated in a Tx-capable module that includes a Tx-capable filter and even T/R switching. Such an implementation suffers from a large number of filters, and may incur additional cost and loss of T/R switches.

In certain embodiments herein, filter reuse in RF front-end systems is provided. In particular, a front-end system includes a filter, an LNA, and a switch interposed between the filter and an input to the LNA. In a first state of the switch, the filter serves to filter an RF signal that is amplified by the LNA. The front-end system further includes a power amplifier that is coupled to the switch. Additionally, in a second state of the switch, the filter serves to filter an amplified RF transmit signal provided by the power amplifier.

Accordingly, a filter along a receive path of the front-end system is reused for transmit. Such filter reused techniques can be combined with broadband modules as described earlier, thereby achieving further gains in cost, component count, and flexibility. For example, the filter, the low noise amplifier, and/or the power amplifier can be operable in multiple bands (for example, Bx or By).

For FR1 5G implementations, 4×4 downlink MIMO is specified for n38, n41, n7, n77, n78, and n79. With respect to receive, such filters are sized for lower powers, typically smaller than Tx-capable filters. However, because of the large passband relative to percentage bandwidth, Rx filters are not that much smaller than Tx-capable filters (for instance, due to bandwidth requirements for a ladder topology and implementation).

By increasing the power handling capability of an antenna switch within a MIMO Rx module, a filter (for instance, n41) can be reused for a second placement of a power amplifier to support uplink MIMO and intra-band EN-DC. The insertion loss of the receiver is low and smaller than if an additional module introduced an in-line T/R switch. An additional cost savings for a band (for instance, n41) can be achieved by implementing the power amplifier in a broad band configuration that is operable over multiple frequency bands (for instance, n41 and n78). Such an implementation is particularly beneficial when the multiple frequency bands are not operated concurrently.

Figure 7A:
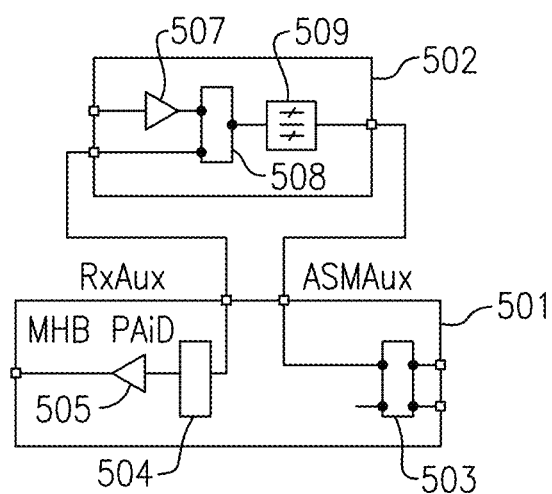
FIG. 7A is a schematic diagram of one embodiment of filter reuse for a front-end system.

FIG. 7A is a schematic diagram of one embodiment of filter reuse for a front-end system. A portion of the front-end system including an Rx module 501 and a Tx-capable module 502 is depicted.

As shown in FIG. 7A, the Rx module 501 includes an antenna switch 503 (for connecting to an antenna), an LNA switch 504, and an LNA 505. Additionally, the Tx-capable module 502 includes a power amplifier 507, a switch 508, and a filter 509.

In the illustrated embodiment, the filter 509 can be used to filter an RF signal received from an antenna. For example, such an RF receive signal can be routed through the switch 503 to the filter 509, and thereafter to the LNA 505 through the switch 508 and the switch 504. Furthermore, the filter 509 can be used to filter an RF transmit signal generated by the power amplifier 507. For example, the RF transmit signal can propagate through the switch 508, the filter 509, and the switch 503 to reach the antenna.

In certain implementations, the filter 509 is implemented for n41, and the power amplifier 507 corresponds to a second placement of an n41 power amplifier. In certain implementations, the power amplifier 507 is bandwidth controllable to operate over bands Bx and By (for instance, n41 and n78). Although various frequency bands have been described, other implementations are possible.

Figure 7B:
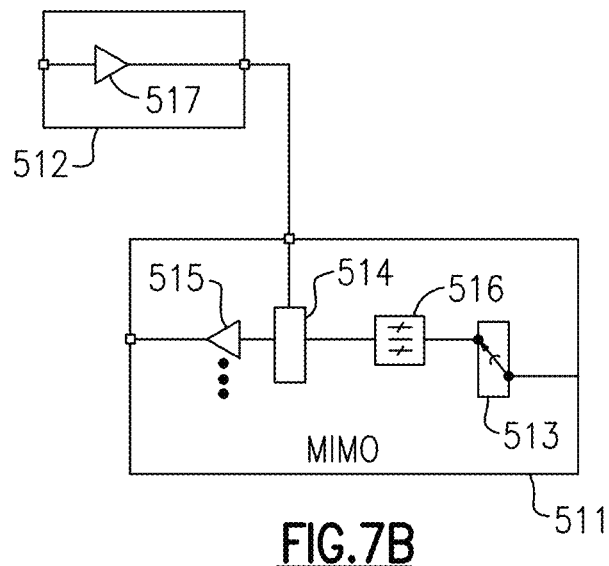
FIG. 7B is a schematic diagram of another embodiment of filter reuse for a front-end system.

FIG. 7B is a schematic diagram of another embodiment of filter reuse for a front-end system. A portion of the front-end system including an Rx module 511 and a Tx-capable module 512 is depicted.

As shown in FIG. 7B, the Rx module 511 includes an antenna switch 513, a T/R switch 514, an LNA 515, and a filter 516. Additionally, the Tx-capable module 512 includes a power amplifier 517.

The filter 516 is used both for transmit and receive. For example, an RF signal received from an antenna can be routed through the antenna switch 513 and the T/R switch 514 to the LNA 515. Additionally, an RF transmit signal from the power amplifier 517 can be routed through the T/R switch 514, the filter 516, and the antenna switch 513 to reach the antenna.

Figure 7C:
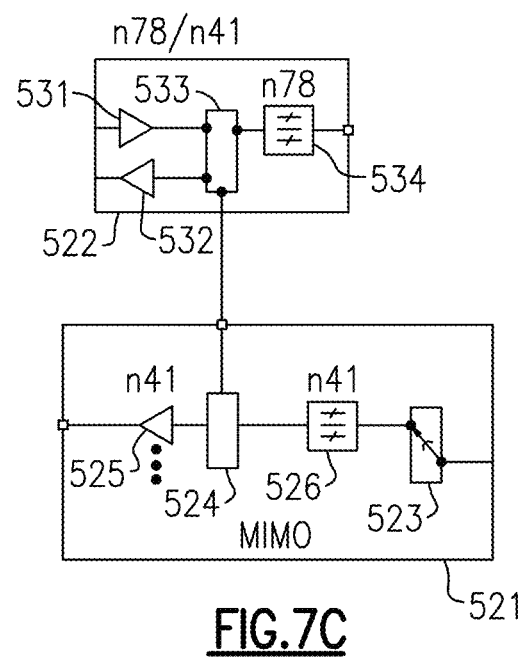
FIG. 7C is a schematic diagram of another embodiment of filter reuse for a front-end system.

FIG. 7C is a schematic diagram of another embodiment of filter reuse for a front-end system. A portion of the front-end system including an Rx module 521 and a Tx-capable module 522 is depicted. In this example, the Rx module 521 handles n41 while the Tx-capable module 522 operates over n78 and n41.

As shown in FIG. 7C, the Rx module 521 includes an antenna switch 523, a T/R switch 524, an n41 LNA 525, and an n41 filter 526. Additionally, the Tx-capable module 522 includes an n78/n41 power amplifier 531, an n78 LNA 532, a T/R switch 533, and an n78 filter 534.

The n41 filter 526 is used both for transmit and receive. For example, an n41 signal received from an antenna can be routed through the antenna switch 523 and the T/R switch 524 to the n41 LNA 525. Additionally, an n41 transmit signal from the n41/n78 power amplifier 527 can be routed through the T/R switch 533, T/R switch 524, the n41 filter 526, and the antenna switch 523 to reach the antenna. The n41/n78 can also provide an n78 transmit signal through the T/R switch 533 and the n78 filter 534 to the same or different antenna.

Figure 8A:
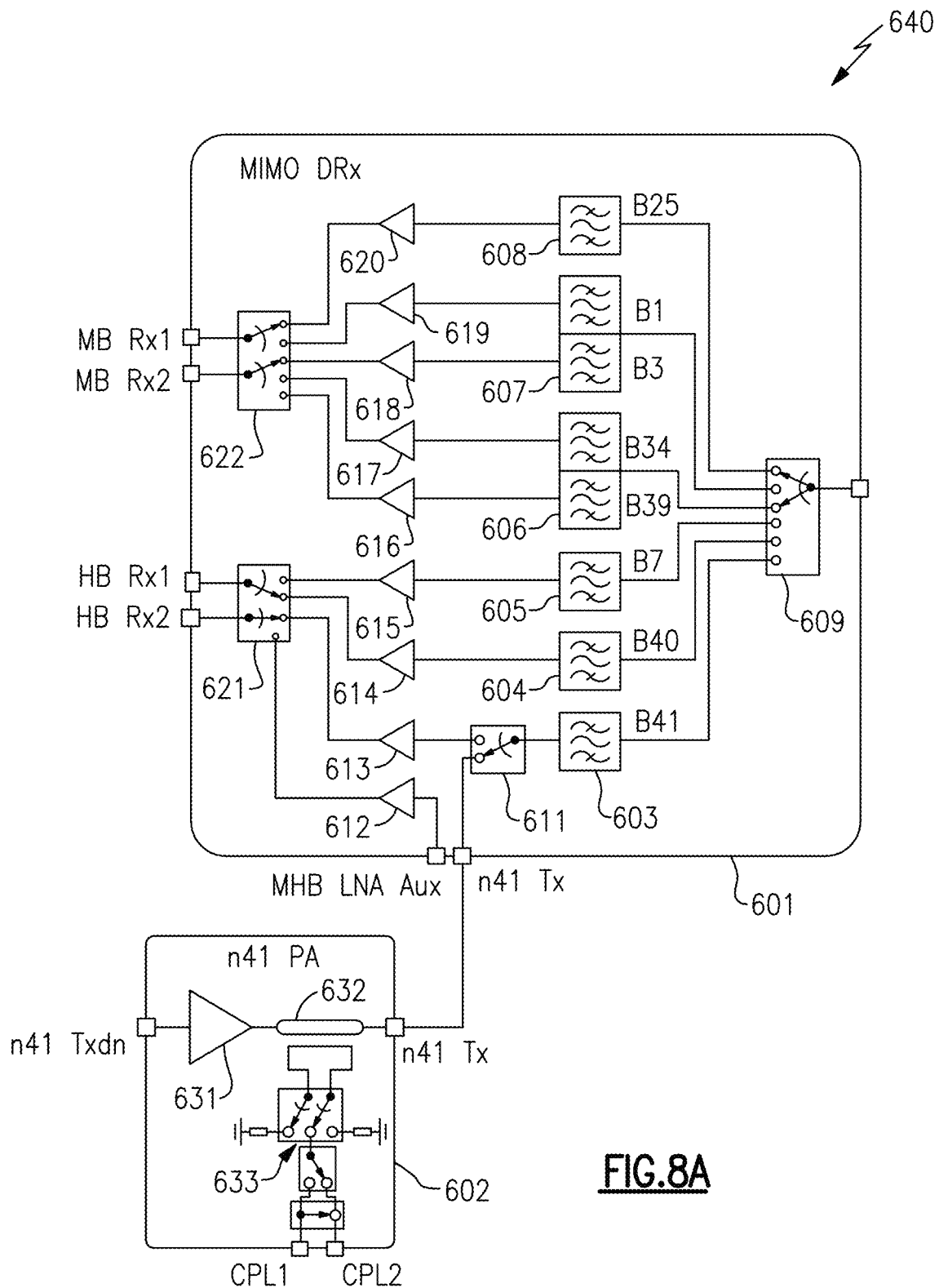
FIG. 8A is a schematic diagram of another embodiment of filter reuse for a front-end system.

FIG. 8A is a schematic diagram of another embodiment of filter reuse for a front-end system. A portion 640 of the front-end system including a DRx MIMO module 601 and a PA module 602 is depicted.

In the illustrated embodiment, the DRx MIMO module 601 includes a B41 filter 603, a B40 filter 604, a B7 filter 605, a B34/B39 filter 606, a B1/B3 filter 607, a B25 filter 608, an antenna switch 609, a T/R switch 611, an auxiliary LNA 612, a B41 LNA 613, a B40 LNA 614, a B7 LNA 615, a B39 LNA 616, a B34 LNA 617, a B3 LNA 618, a B1 LNA 619, a B25 LNA 620, a HB LNA output switch 621, and an MB LNA output switch 622.

The PA module 602 includes an n41 PA 631, a directional coupler 632, and coupler termination and switching circuitry 633.

When transmitting n41, the power amplifier 631 provides an n41 transmit signal through the T/R switch 611, B41 filter 603, and antenna switch 609 of the DRx MIMO module 601. Thus, the B41 filter 603 is used for diversity receive when the B41 LNA 613 is operational, and for n41 transmit when the power amplifier 631 is operational.

To achieve n41 bandwidth, a ladder topology is typically used to implement a filter, and thus less difference in area is present between Rx n41 filters and Tx n41 filters based on power handling. Additionally, the insertion loss through a single-pole double-throw (SP2T) switch is about the same as through MHB PAID. Thus, the illustrated embodiment uses n41 filter re-use and a power amplifier placement (which can be a second placement for dual uplink) through a MIMO DRx module.

Figure 8B:
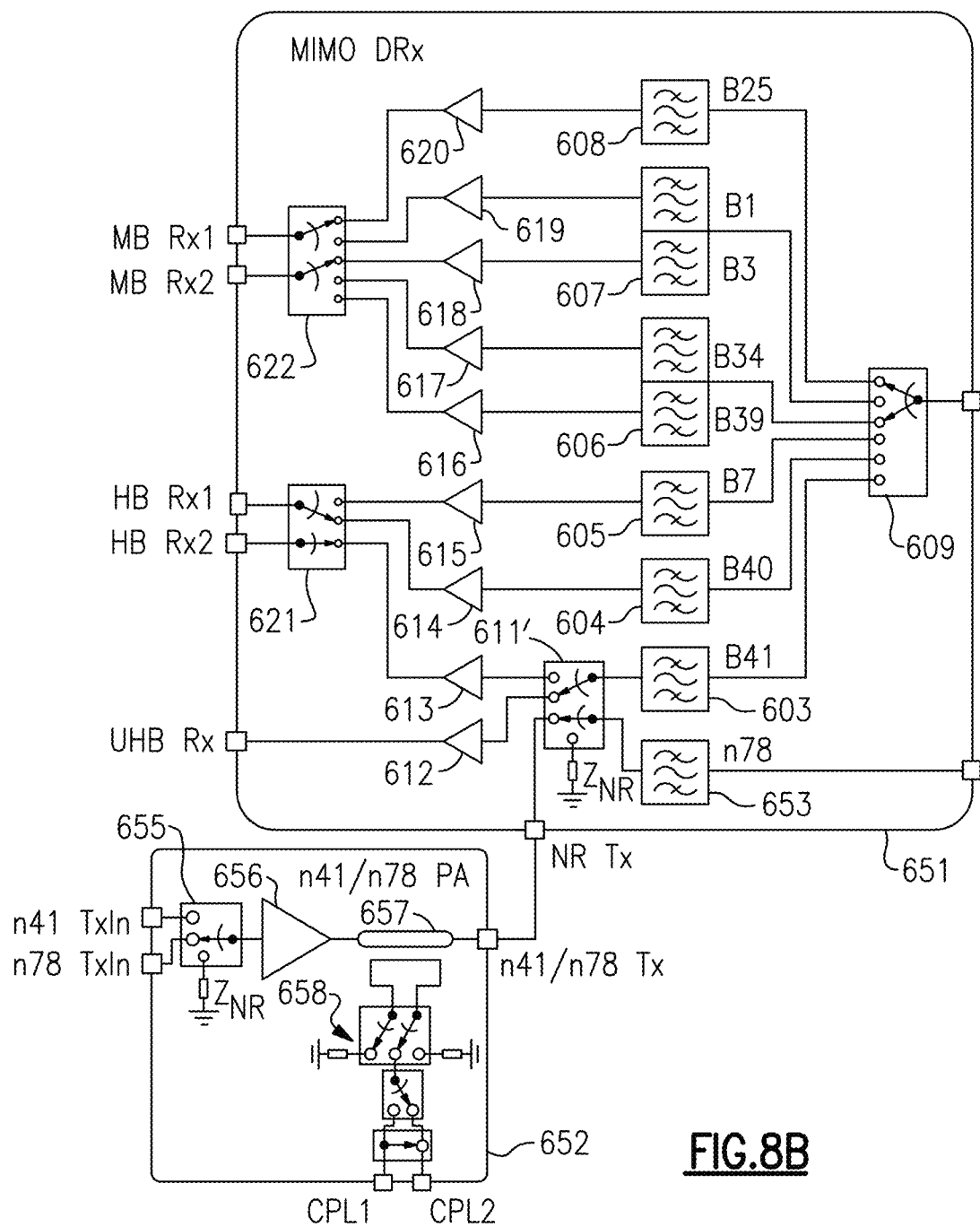
FIG. 8B is a schematic diagram of another embodiment of filter reuse for a front-end system.

FIG. 8B is a schematic diagram of another embodiment of filter reuse for a front-end system. A portion of the front-end system including a DRx MIMO module 651 and a PA module 652 is depicted.

The DRx MIMO module 651 of FIG. 8B is similar to the DRx MIMO module 601 of FIG. 8A, except that the DRx MIMO module 651 further includes an n78 filter 653 and includes a switch 611' with an additional pole for connecting to the n78 filter 653 to the auxiliary LNA 612.

In comparison to the PA module 602 of FIG. 8A that operates over n41, the PA module 652 has bandwidth sufficient to operate over n41 and n78 or is configurable to do so. Thus, the PA module 652 includes an n41/n78 selection switch 655, an n41/n78 power amplifier 656, a directional coupler 657, and coupler termination and switching circuitry 658.

Thus, n41 and n78 filter re-use of Rx paths for a second transmit placement is provided. When comparing the bandwidth for n41 (2515-2675 MHz) and n78 (3300-3800 MHz), the relative percent bandwidth is about 40.7%, and thus an estimated efficiency penalty for operating over both n41 and n78 is about 5%. In certain implementations, configurable impedance matching is provided to accommodate the wide bandwidth path. Additionally, a coupler can be included for aiding in power detection, power control, and/or digital pre-distortion (DPD).

Figure 8C:
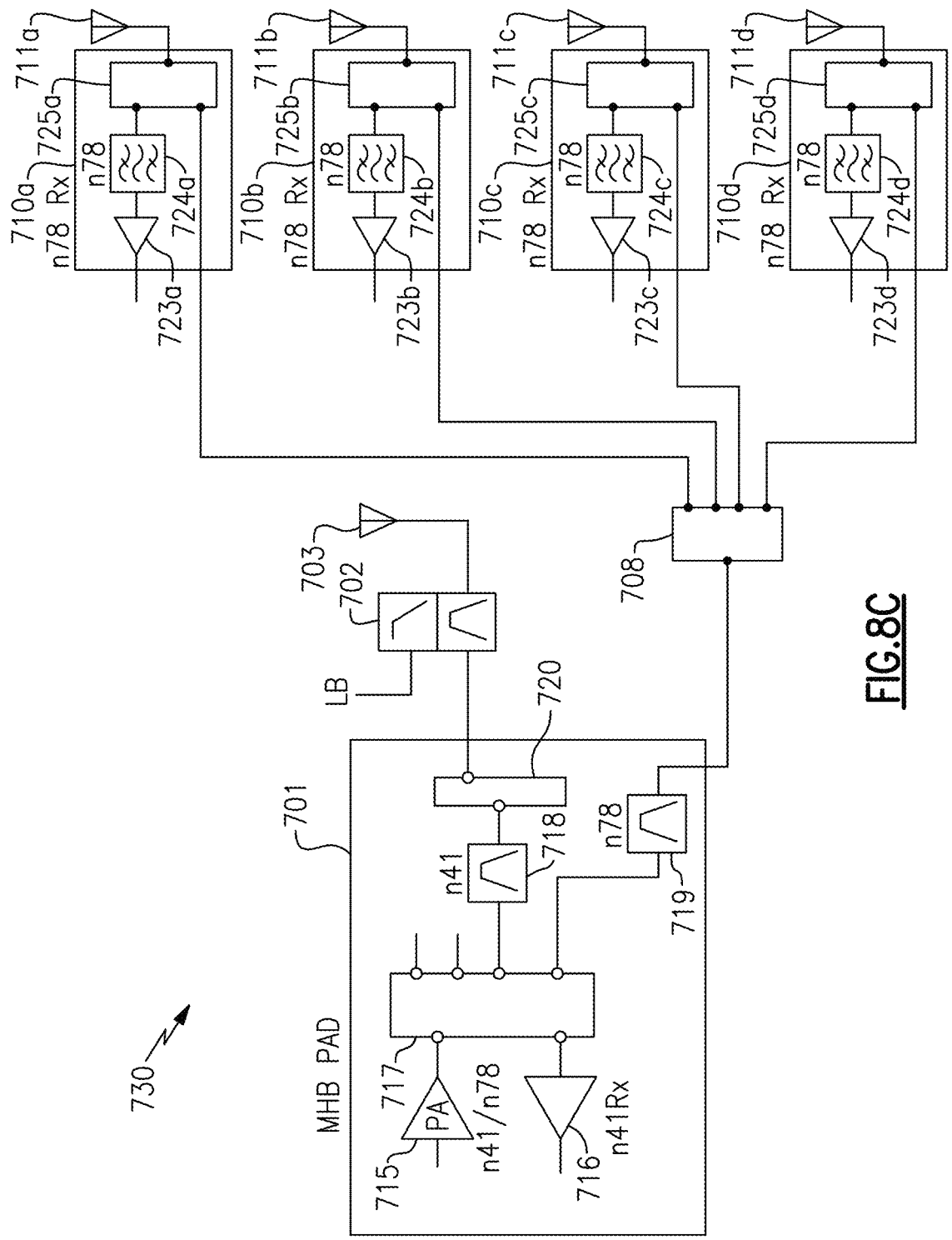
FIG. 8C is a schematic diagram of another embodiment of filter reuse for a front-end system.

FIG. 8C is a schematic diagram of another embodiment of filter reuse for a front-end system. A portion of the front-end system including a MHB PAD 701, a LB/MHB diplexer 702, an LB/MB/HB antenna 703, a multi-throw switch 708, a first n78 Rx module 710a, a second n78 Rx module 710b, a third n78 Rx module 710c, a fourth n78 Rx module, a first MB/HB/UHB antenna 711a, a second MB/HB/UHB antenna 711b, a third MB/HB/UHB antenna 711c, and a fourth MB/HB/UHB antenna 711d is depicted.

As shown in FIG. 8C, the MHB PAD 701 includes an n41/n78 power amplifier 715, an n41 LNA 716, a transmit/receive band selection switch 717, an n41 filter 718, an n78 filter 719, and an antenna selection switch 720.

The n41/n78 power amplifier 715 is broadband to selectively provide amplification to n41 or n78. When transmitting n41, an amplified n41 transmit signal can be provided from the n41/n78 power amplifier 715 to the LB/MB/HB antenna 703 by way of the transmit/receive band selection switch 717, the n41 filter 718, the antenna selection switch 720, and the LB/MHB diplexer 702. Additionally, when receiving n41, an n41 receive signal can be provided from the LB/MB/HB antenna 703 to the n41 LNA 716 by way of the LB/MHB diplexer 702, the antenna selection switch 720, the n41 filter 718, and the transmit/receive band selection switch 717.

In the illustrated embodiment, the front-end system has also been implemented to support 4×4 downlink MIMO support for n78. For example, the first n78 Rx module 710a includes a first transmit/receive switch 725a, a first n78 filter 724a, and a first n78 LNA 723a, and is coupled to the first MB/HB/UHB antenna 711a for processing a first n78 receive signal. Additionally, the second n78 Rx module 710b includes a second transmit/receive switch 725b, a second n78 filter 724b, and a second n78 LNA 723b, and is coupled to the second MB/HB/UHB antenna 711b for processing a second n78 receive signal. Furthermore, the third n78 Rx module 710c includes a third transmit/receive switch 725c, a third n78 filter 724c, and a third n78 LNA 723c, and is coupled to the third MB/HB/UHB antenna 711c for processing a third n78 receive signal. Additionally, the fourth n78 Rx module 710d includes a fourth transmit/receive switch 725d, a fourth n78 filter 724d, and a fourth n78 LNA 723d, and is coupled to the fourth MB/HB/UHB antenna 711d for processing a fourth n78 receive signal.

With continuing reference to FIG. 8C, the n41/n78 power amplifier 715 can be used to provide an n78 transmit signal to any of the antennas 711a, 711b, 711c, or 711d by way of the transmit/receive band selection switch 717, the n78 filter 719, the multi-throw switch 708, and a corresponding one of the n78 Rx modules 710a, 710b, 710c, or 710d.

Figure 8D:
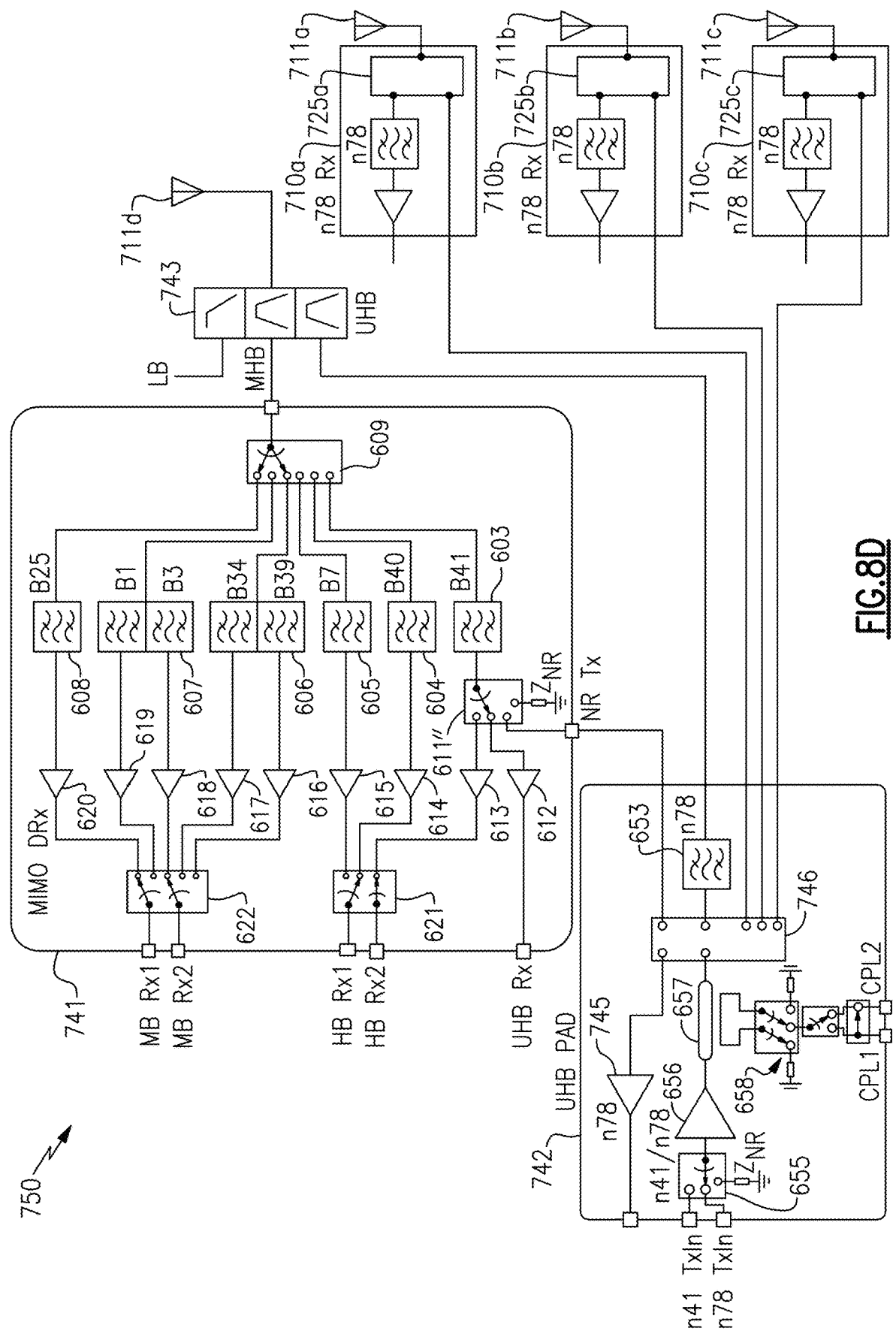
FIG. 8D is a schematic diagram of another embodiment of filter reuse for a front-end system.

FIG. 8D is a schematic diagram of another embodiment of filter reuse for a front-end system. A portion of the front-end system including a DRx MIMO module 741, a UHB PAD 742, a triplexer 743, a first n78 Rx module 710a, a second n78 Rx module 710b, a third n78 Rx module 710c, a first MB/HB/UHB antenna 711a, a second MB/HB/UHB antenna 711b, a third MB/HB/UHB antenna 711c, and a fourth MB/HB/UHB antenna 711d is depicted.

The DRx MIMO module 741 of FIG. 8D is similar to the DRx MIMO module 601 of FIG. 8A, except that the DRx MIMO module 741 includes a switch 611" with an additional pole for connecting to the auxiliary LNA 612, which drives a UHB Rx port. As shown in FIG. 8D, the LB/MHB/UHB triplexer 743 is coupled to the fourth MB/HB/UHB antenna 711d and serves to triplex an LB signal, an MHB signal, and a UHB signal.

With continuing reference to FIG. 8D, the UHB PAD 742 includes an n41/n78 selection switch 655 (for selecting between an n41 transmit signal on n41 TxIn or an n78 transmit signal on n78 TxIn), an n41/n78 PA 656, a directional coupler 657, coupler termination and switching circuitry 658, an n78 LNA 745, a transmit/receive selection switch 746, and an n78 transmit filter 653.

When transmitting n41, the power amplifier 656 provides an n41 transmit signal to the antenna 711d through the transmit/receive selection switch 746, the DRx MIMO module 741, and the LB/MHB/UHB triplexer 743. Thus, the B41 filter 603 is used for diversity receive when the B41 LNA 613 is operational, and for n41 transmit when the power amplifier 656 is operational.

The power amplifier 656 can also be used for transmitting n78 on the antenna 711d by way of the transmit/receive selection switch 746, the n78 filter 653, and the LB/MHB/UHB triplexer 743. Additionally, 4×4 downlink MIMO support for n78 is provided using modules 710a, 710b, 710c, and 742.

With reference to FIGS. 8A-8D, a dual (broad-banded) PA can be co-packaged with other parts of a radio in a wide variety of configurations. For example, an HB+n78 dual PA can take the place of an HB PA in the MHB PAD (with an additional n78 Tx filter integrated for the n78 Tx path), and with the radio supporting 4 additional Rx-only n78 DL modules to provide 4×4 DL MIMO for n78.

Accordingly, in various examples, an n41/n78 dual broad-banded PA can be separate from PAD integration (see, for example, FIGS. 8A and 8B), take the place of the HB PA in the MHB PAD (see, for example, FIG. 8C), or take the place of the UHB PA in the UHB PAD (see, for example, FIG. 8D).

Figure 9:
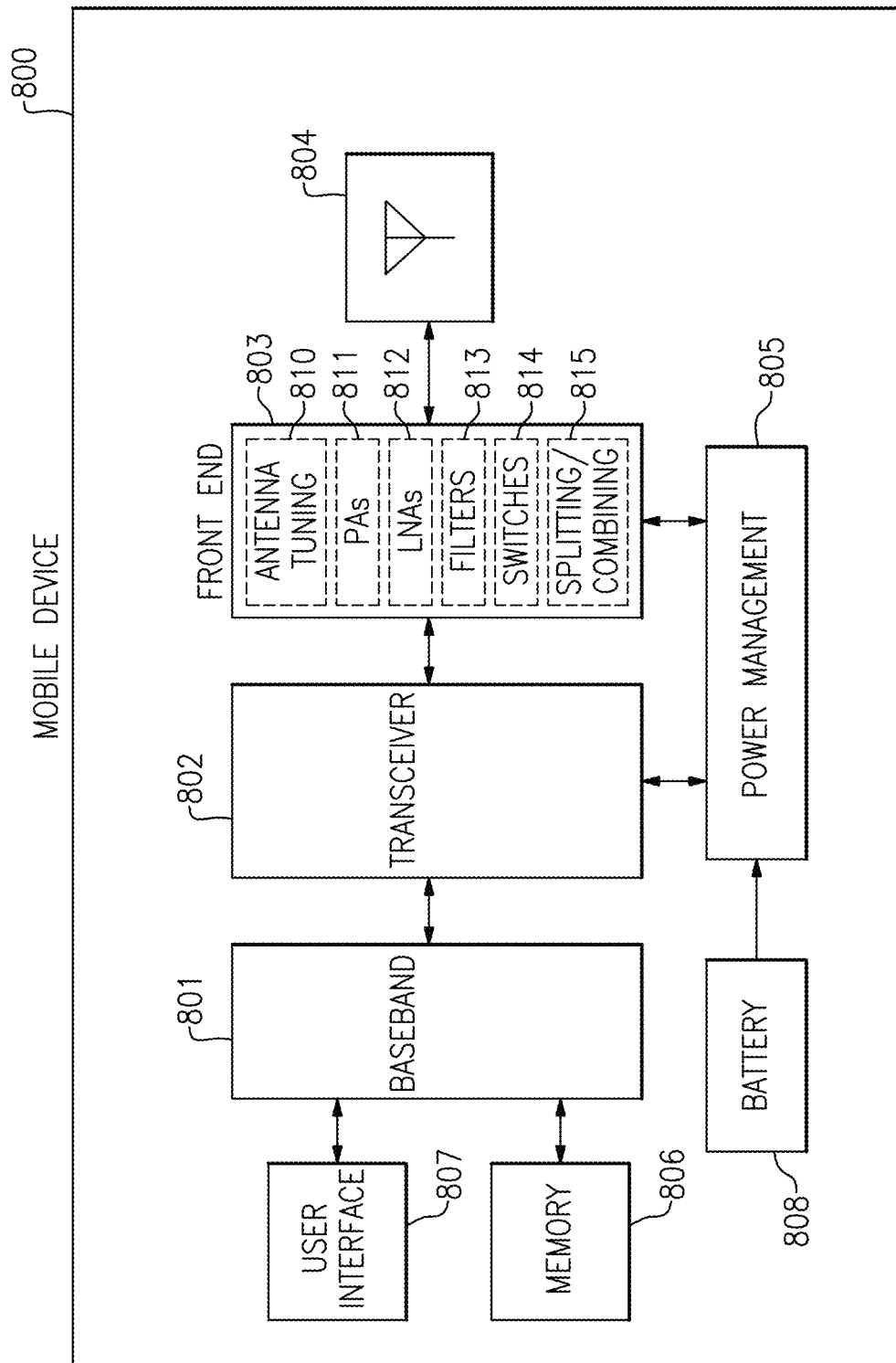
FIG. 9 is a schematic diagram of one embodiment of a mobile device.

FIG. 9 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 9 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both FDD and TDD, and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 9, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 9, the power management system 805 receives a battery voltage from the battery 808. The battery 808 can be any suitable battery for use in the mobile device 800, including, for example, a lithium-ion battery.

Applications

Some of the embodiments described above have provided examples in connection with mobile devices. However, the principles and advantages of the embodiments can be used for any other systems or apparatus that have needs for broadband architectures. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency front-end system with filter reuse, the radio frequency front-end system comprising:
    a filter reuse switch having a plurality of states including a first state, a second state, and a third state;
    a first bandpass filter of a first frequency band coupled to the filter reuse switch;
    a second bandpass filter of a second frequency band coupled to the filter reuse switch;
    a low noise amplifier configured to receive a radio frequency receive signal through the first bandpass filter and the filter reuse switch in the first state; and
    a power amplifier operable over the first frequency band and the second frequency band, the power amplifier configured to output a first amplified radio frequency transmit signal through the filter reuse switch and the first bandpass filter in the second state, and to output a second amplified radio frequency transmit signal through the filter reuse switch and the second bandpass filter in the third state.

2. The radio frequency front-end system of claim 1 further comprising an antenna switch, the first bandpass filter connected between the filter reuse switch and the antenna switch.

3. The radio frequency front-end system of claim 2 wherein the low noise amplifier, the filter reuse switch, the first bandpass filter, and the antenna switch are implemented on a receive module, and the power amplifier is implemented on a power amplifier module.

4. The radio frequency front-end system of claim 2 wherein the low noise amplifier, the filter reuse switch, the first bandpass filter, the antenna switch, and the power amplifier are implemented on a common module.

5. The radio frequency front-end system of claim 1 further comprising a signal selection switch including a first input configured to receive a first radio frequency transmit signal, a second input configured to receive a second radio frequency transmit signal, and an output configured to provide one of the first radio frequency transmit signal or the second radio frequency transmit signal to the power amplifier for amplification.

6. The radio frequency front-end system of claim 1 wherein the first frequency band is n41 and the second frequency band is n78.

7. A mobile device comprising:
a transceiver; and
a radio frequency front-end system including a filter reuse switch having a plurality of states including a first state, a second state, and a third state, the radio frequency front-end system further including a first bandpass filter of a first frequency band coupled to the filter reuse switch, a second bandpass filter of a second frequency band coupled to the filter reuse switch, a low noise amplifier configured to receive a radio frequency receive signal through the first bandpass filter and the filter reuse switch in the first state, and a power amplifier operable over the first frequency band and the second frequency band, the power amplifier configured to output a first amplified radio frequency transmit signal through the filter reuse switch and the first bandpass filter in the second state, and to output a second amplified radio frequency transmit signal through the filter reuse switch and the second bandpass filter in the third state.

8. The mobile device of claim 7 wherein the radio frequency front-end system further includes an antenna switch, the first bandpass filter connected between the filter reuse switch and the antenna switch.

9. The mobile device of claim 8 wherein the low noise amplifier, the filter reuse switch, the first bandpass filter, and the antenna switch are implemented on a receive module, and the power amplifier is implemented on a power amplifier module.

10. The mobile device of claim 8 wherein the low noise amplifier, the filter reuse switch, the first bandpass filter, the antenna switch, and the power amplifier are implemented on a common module.

11. The mobile device of claim 8 further comprising a first antenna configured to transmit the first amplified radio frequency transmit signal.

12. The mobile device of claim 11 further comprising a second antenna configured to transmit the second amplified radio frequency transmit signal.

13. The mobile device of claim 7 wherein the radio frequency front-end system further includes a signal selection switch including a first input configured to receive a first radio frequency transmit signal, a second input configured to receive a second radio frequency transmit signal, and an output configured to provide one of the first radio frequency transmit signal or the second radio frequency transmit signal to the power amplifier for amplification.

14. The mobile device of claim 7 wherein the first frequency band is n41 and the second frequency band is n78.

15. A method of filter reuse in a mobile device, the method comprising:
receiving a radio frequency receive signal as an input to a low noise amplifier in a first state of a filter reuse switch, the radio frequency receive signal received through a first bandpass filter of a first frequency band and the filter reuse switch;
outputting a first amplified radio frequency transmit signal from a power amplifier that is operable over the first frequency band and a second frequency band, and providing the first amplified radio frequency transmit signal through the filter reuse switch and the first bandpass filter in a second state of the filter reuse switch; and
outputting a second amplified radio frequency transmit signal from the power amplifier, and providing the second amplified radio frequency transmit signal through the filter reuse switch and a second bandpass filter of the second frequency band in a third state of the filter reuse switch.

16. The method of claim 15 further comprising providing the first amplified radio frequency transmit signal to an antenna switch, the first bandpass filter connected between the filter reuse switch and the antenna switch.

17. The method of claim 16 further comprising transmitting the first amplified radio frequency transmit signal on a first antenna.

18. The method of claim 17 further comprising further comprising transmitting the second amplified radio frequency transmit signal on a second antenna.

19. The method of claim 15 further comprising receiving a first radio frequency transmit signal at a first input of a signal selection switch, receiving a second radio frequency transmit signal at a second input of the signal selection switch, and providing one of the first radio frequency transmit signal or the second radio frequency transmit signal from an output of the signal selection switch to the power amplifier.

20. The method of claim 15 wherein the first frequency band is n41 and the second frequency band is n78.

* * * * *